United States Patent
Iancu

(10) Patent No.: US 9,948,859 B2
(45) Date of Patent: Apr. 17, 2018

(54) VIDEO IMAGE ALIGNMENT FOR VIDEO STABILIZATION

(71) Applicant: Optimum Semiconductor Technologies, Inc., Tarrytown, NY (US)

(72) Inventor: Daniel Sabin Iancu, Pleasantville, NY (US)

(73) Assignee: Optimum Semiconductor Technologies, Inc., Tarrytown, NY (US)

( * ) Notice: Subject to any disclaimer, the term of this patent is extended or adjusted under 35 U.S.C. 154(b) by 0 days.

(21) Appl. No.: 15/236,904

(22) Filed: Aug. 15, 2016

(65) Prior Publication Data
US 2017/0054909 A1 Feb. 23, 2017

Related U.S. Application Data

(60) Provisional application No. 62/206,911, filed on Aug. 19, 2015.

(51) Int. Cl.
H04N 5/232 (2006.01)
H04N 19/14 (2014.01)
G06T 7/262 (2017.01)

(52) U.S. Cl.
CPC ......... H04N 5/23267 (2013.01); G06T 7/262 (2017.01); H04N 19/14 (2014.11); G06T 2207/20056 (2013.01); H04N 5/23254 (2013.01)

(58) Field of Classification Search
CPC .............. H04N 5/23267; H04N 19/40; H04N 5/23254; G06T 7/002; G06T 7/262; G06T 2207/20056; G03G 9/7038
See application file for complete search history.

(56) References Cited

U.S. PATENT DOCUMENTS

| 6,373,970 | B1 | 4/2002 | Dong et al. |
| 6,711,293 | B1 | 3/2004 | Lowe |
| 7,042,525 | B1 | 5/2006 | Yu |
| 2008/0090312 | A1* | 4/2008 | Park ............. G03F 9/7038 438/14 |
| 2008/0262297 | A1* | 10/2008 | Gilboa ........... A61B 1/00128 600/109 |

(Continued)

OTHER PUBLICATIONS

Canny, J., "A Computational Approach to Edge Detection", IEEE Trans. Pattern Analysis and Machine Intelligence, pp. 679-698, 1986.
Lowe, D. G., "Distinctive Image Features from Scale-Invariant Keypoints", International Journal of Computer Vision, 60, 2, pp. 91-110, 2004.

(Continued)

Primary Examiner — Hung H Lam
(74) Attorney, Agent, or Firm — Lowenstein Sandler LLP

(57) ABSTRACT

A system and method relate to calculating a first edge map associated with a reference video frame, generating a second edge map associated with an incoming video frame, generating an offset between the reference video frame and the video frame based on a first frequency domain representation of the first edge map and a second frequency domain representation of the second edge map, translating locations of a plurality of pixels of the incoming video frame according to the calculated offset to align the incoming video frame with respect to the reference video frame, and transmitting the aligned video frame to a downstream device.

20 Claims, 34 Drawing Sheets

(56) References Cited

U.S. PATENT DOCUMENTS

| | | | |
|---|---|---|---|
| 2010/0054592 A1* | 3/2010 | Nanu | G06T 5/008 |
| | | | 382/167 |
| 2013/0053658 A1* | 2/2013 | Peacock | A61B 5/055 |
| | | | 600/309 |
| 2013/0114906 A1* | 5/2013 | Diggins | G06T 7/0002 |
| | | | 382/218 |
| 2015/0206369 A1 | 7/2015 | Baltazor | |
| 2017/0094291 A1* | 3/2017 | Sun | H04N 19/40 |

OTHER PUBLICATIONS

T. Suzuki and T. Ikenaga, "SIFT-Based Low Complexity Keypoint Extraction and Its Real-Time Hardware Implementation for Full-HD Video", IEEE Proc. of Signal & Information Processing Association Annual Summit and Conference, pp. 1-6, 2012.

Ning Zu's Home; "SIFT Implementation"; http://xuning-cn.blogspot.com/2007/11/sift-implementation_30.html, Dec. 7, 2007, 15 pages.

"Time Complexity of Canny Edge Detector—Stack Overflow"; http://stackoverflow.com/questions/17458237/time-complexity-of-canny-edge-detecor, 3 pages.

Andrea Vedaldi, "SIFT for Matlab"; http://vision.ucla.edu/~vedaldi/code/sift.html, 2 pages.

"KLT: An Implementation of the Kanade-Lucas-Tomasi Feature Tracker"; http://www.ces.clemson.edu/~stb/klt/, 1 page.

PCT, Notification of Transmittal of the International Search Report and the Written Opinion of the International Searching Authority, or the Declaration, for International Application No. PCT/US16/47474, dated Nov. 2, 2016 12 pages.

\* cited by examiner

VIDEO IMAGE ALIGNMENT FOR VIDEO STABILIZATION

CROSS-REFERENCE TO RELATED APPLICATION

This application claims the benefit of U.S. provisional patent application No. 62/206,911 filed Aug. 19, 2015, the disclosure of which is incorporated herein by reference in its entirety.

TECHNICAL FIELD

Implementations of the present disclosure relate to video processing, and more particular, to video frame alignment for video stabilization.

BACKGROUND

When a person uses a hand-held camera to record a video, the video may exhibit shakes and jitters due to unintentional body movements by the person. These shakes and jitters may adversely affect the video quality.

SUMMARY

Therefore, there is a need to stabilize the images in a video recording. Implementations of the present disclosure provide a technical solution that employs a frequency domain video frame alignment method to stabilize video recordings. This method utilizes frequency domain information encoding information in time and space to estimate an offset (e.g., in terms of a number of pixels) between two video frames in the video recording for video frame alignment. Because the computational complexity in frequency domain processing is lower than those required by space domain processing approaches, the frequency domain processing method is more efficient for video stabilization.

The above-described problems are remedied by providing a processing device that calculates the offset between an incoming video frame and a reference video frame in the frequency domain. The processing device may transform an incoming video frame from the spatial domain to the frequency domain to obtain a frequency domain representation. The processing device may estimate an offset between an edge of a reference video frame and an edge of the transformed image based on the frequency domain representation. The processing device may align the incoming video frame to the reference video frame in view of the offset to produce an aligned video frame. The processing device may transmit the aligned image to a downstream device.

The processing device may detect an edge of the incoming video frame. The edge may be detected using an edge detection method (e.g., the Canny edge detector or differential of Gaussian (DOG) edge detector). The processing device may determine an offset between the edge in the incoming video frame relative to a corresponding edge in the reference video frame. The alignment processor may adjust a location of each pixel of the incoming video frame in view of the offset. The reference frame may be updated at a rate that depends on at least one of video frame rate or video quality.

BRIEF DESCRIPTION OF THE DRAWINGS

The present invention may be more readily understood from the detailed description of an exemplary implementation presented below considered in conjunction with the following drawings.

DETAILED DESCRIPTION

A video clip is composed of a sequence of video frames each having a pre-determined dimension according to the recording format. Each video frame may include an array of pixels (e.g., 1920 by 1080 pixels in the HDTV format), and the sequence of video frames are image representations of the scene captured by an image sensor at a video frame rate (e.g., 30 frames/second). The recorded video may be encoded according to a video compression standard (e.g., the MPEG-2), and may be decoded into raw image data during playback. Implementations of the present disclosure include a method to process video frames for video stabilization. Each one of the video frames may be decimated (i.e., spatially sub-sampled) into video frames of a lower resolution to reduce the amount of computation. An edge detector (e.g., the Canny edge detector) may be employed to calculate an edge map associated with the video frames. Frequency transformation (e.g., Fourier transformation) is then applied to the edge maps associated with the video frames to convert them into the frequency domain representations. In the frequency domain, the offset of pixels between a video frame and a reference video frame is estimated according to their frequency domain representations. The estimated offset may be employed to align a video frame relative to a reference video frame. The computation complexity for calculating edges in the frequency domain is approximately O (mn log mn) if the size of the video frame is m×n pixels. As a result, the video can be stabilized in a more efficient way without sacrificing the quality of the stabilized video.

Figure 1:
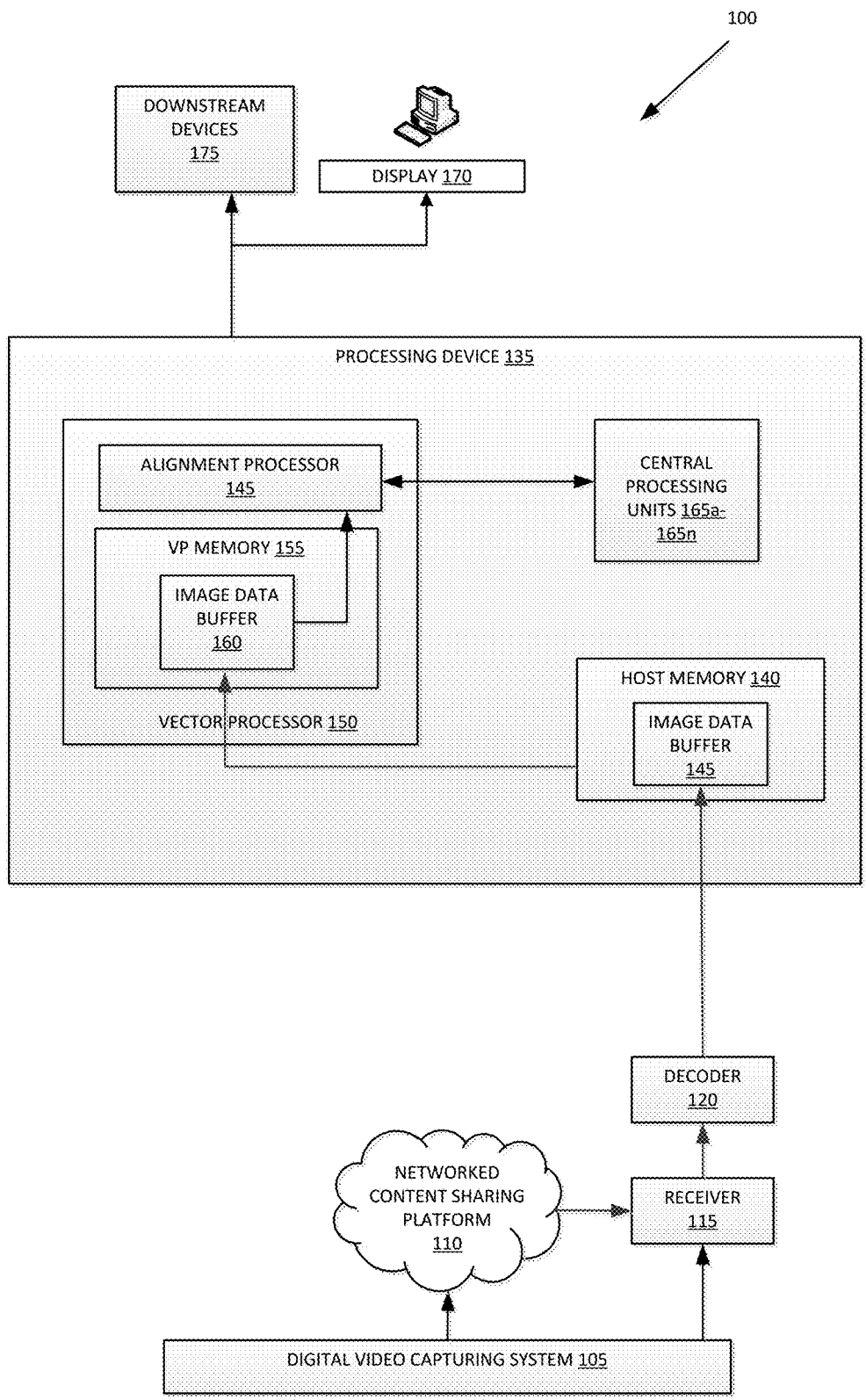
FIG. 1 is a block diagram that illustrates a computing system according to an implementation of the present disclosure.

FIG. 1 is a block diagram that illustrates a computing system that stabilizes image data (e.g., digital still images or video frames) according to an implementation of the present disclosure. As shown in FIG. 1, the computing system 100 may receive encoded image data from a source that can be a digital video capturing system 105 or a networked content sharing platform 110. The computing system 100 may include a processing device 135 further including one or more central processing units 165a-165n. The processing device 135 may be communicatively coupled to a host memory 140. The host memory 140 may store decoded image data (e.g., digital image or video data) received by a receiver 115, decoded by a decoder 120, and passed to an image data buffer 145 in host memory 140. The receiver 115 may receive the encoded image data either directly from the digital video capturing system 105 or from networked content sharing platform 110. In one implementation, one or both of the receiver 115 or the decoder 120 may be external to the processing device 135. In another implementation, one or both of the receiver 115 or the decoder 120 may be integrated with the processing device 135.

The processing device 135 may further implement a vector processor 150 (VP). It will be appreciated by those skilled in the art that other co-processor architectures may be utilized besides VPs, such as, but not limited to, DSPs, FPGAs, or ASICs, or adjunct fixed-function features of the processing device 135 itself. It will further be appreciated by those skilled in the art that the vector processor 150 may be collocated on the same physical chip or logical device as the central processing units 165a-165n, also known as an "APU", such as found on mobile phones and tablets. Separate VP and CPU functions may be found on computer server systems where the VP is a physical expansion card, and personal computer systems and laptops. The VP 150 may include a VP memory 155. It will be appreciated by those skilled in the art that the host memory 140 and VP memory 155 may also be collocated on the same physical chip(s) or logical device, such as on an APU.

The processing device 135 may be configured to receive the decoded image data. The processing device 135 may be configured to create an image data buffer 145 in host memory 140 based on the received decoded image data. Image data buffer 145 is a region in host memory 140 for storing data such as, for example, the decoded image data. The processing device 135 may be configured to transfer the content stored in image data buffer 145 to image data buffer 160 in the VP memory 150.

The processing device 135 may be configured to implement an alignment processor 145 to receive image data stored in the image data buffer 160. In one implementation, the processing device 135 may implement the alignment processor 145 as a component of the VP 150.

The alignment processor 145 may select a reference video frame from a video recording, where the reference video frame may be updated through the alignment process, and the frequency of updating the reference video image may be decided based on video frame rate, video quality, or other criteria for alignment in order to stabilize the video. After the selection of the reference video frame, responsive to receiving an incoming video frame (which is different from the reference video frame), the alignment processor 145 may perform calculations to align the incoming video frame with respect to the reference video frame. When the incoming video frame is received by the alignment processor 145, the alignment processor 145 may decimate (or subsample spatially) the incoming video frame into a lower resolution. If the reference frame has not already been decimated, the alignment processor 145 may decimate the reference frame to the same scale as the incoming video frame. Decimating the video frame reduces the computational complexity for the remaining processing steps. Furthermore, the alignment processor 145 may perform edge detection calculation on the decimated incoming video frame. An edge in a digital image is formed by pixel intensity discontinuities in the image. Edges may be organized into straight or curved line segments. An edge detector (e.g., the Canny edge detector or any other suitable edge detectors) may be employed to identify edges in the image to generate an edge map associated with the image.

The alignment processor 145 may align the detected edges in the decimated incoming video image and the decimated reference video image. The alignment processor 145 may first perform edge detection using an edge detector to generate an edge map to show the detected edges. The edge map may include binary pixel values where a first intensity value (e.g., high value) may indicate an edge pixel and a second intensity value (e.g., low value) may indicate a non-edge pixel in the decimated incoming video frame. The alignment processor 145 may perform frequency transformation (e.g., by Fourier transform) on the edge maps of the decimated incoming video image to convert the edge map from the time/spatial domains into the frequency domain. Further, alignment processor 145 may estimate pixel offsets between the incoming video frame and the reference video frame based on the frequency domain representation of the decimated reference video image. In order to avoid the influence from the destroyed property at the boundary of the video image, the alignment processor 145 may discard the information near the boundary, and may estimate the pixel offset based on a cropped central portion of the decimated incoming video frame.

Responsive to determining pixel offsets between the incoming video frame relative to the reference video frame, the alignment processor 145 may adjust a location of each pixel of the incoming video frame in view of the determined pixel offset to produce an aligned video frame. A stabilized video is composed of a sequence of aligned video frames.

The alignment processor 145 may store the aligned video frames in the image data buffer 160, suitable for display output on a display 170 or for transmission to one or more downstream devices 175 (e.g., an encoder).

Examples of the present disclosure may be executed on a vector processor 150 that uses register-to-register variable-length vector instructions. This vector processor 150 is designed to allow for varying implementations that can execute the same instructions but at differing rates, allowing for both accommodation for future architecture designs and different price/performance trade-offs. Examples of the present disclosure include features to support both digital signal processing and graphics processing, as well as high-performance computing.

Examples of the present disclosure include a variable-length register vector processor 150 suitable for implementations in a microprocessor. In one example, the vector processor 150 may: allow an instruction to specify a vector lengths with values that are larger than those that may currently be implemented in hardware; and have the vector length specify the number of operations that are to be performed, independent of the number of elements that can be packed into the registers of specific implementation.

Figure 2:
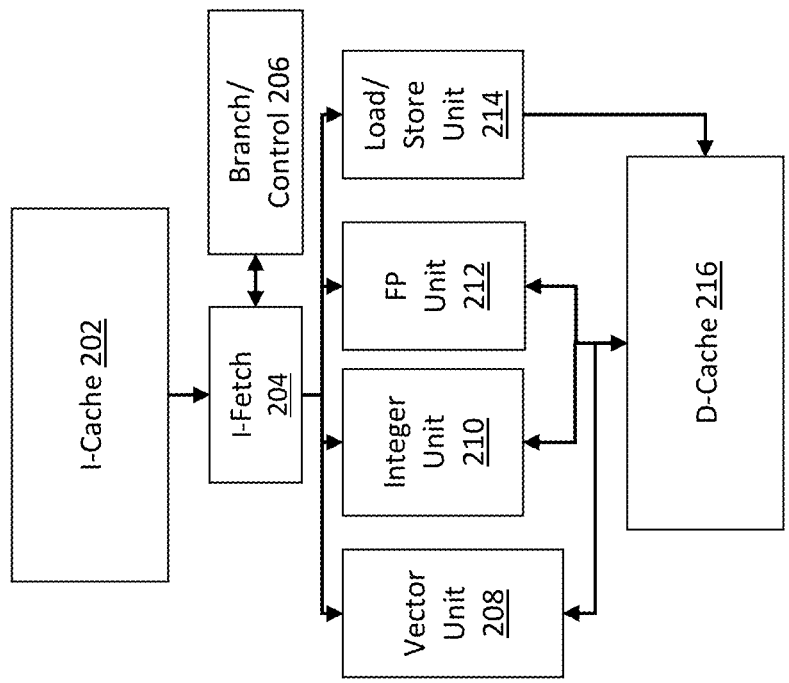
FIG. 2 is a vector processor that may be employed in the computing system as shown in FIG. 1.

In one example, it is assumed that the vector processor 150 is one of several units in a modern out-of-order processor, as shown in FIG. 2 that illustrates a vector processor 150 according to an implementation of the present disclosure.

The vector processor 150 as shown in FIG. 2 may include an instruction cache 202 that holds instructions for execution. The vector processor 150 may further include an instruction fetch unit 204 that fetches instructions from the instruction cache 202. The vector processor 150 may further include a control/branch execution unit 206 that controls the instructions that are fetched from the instruction cache 202 based on both the instructions that are fetched and various prediction methods. The vector processor 150 may further include a variety of units including integer units 210 for executing integer instructions and floating point units 212 for floating point instructions. The vector processor 150 may further include a load/store unit 214 that is responsible for coordinating the movement of data from the memory to the registers associated with the various units. The vector processor 150 may further include a data-cache 216 that holds data elements. The vector processor 150 may further include a vector unit 208.

Figure 3:
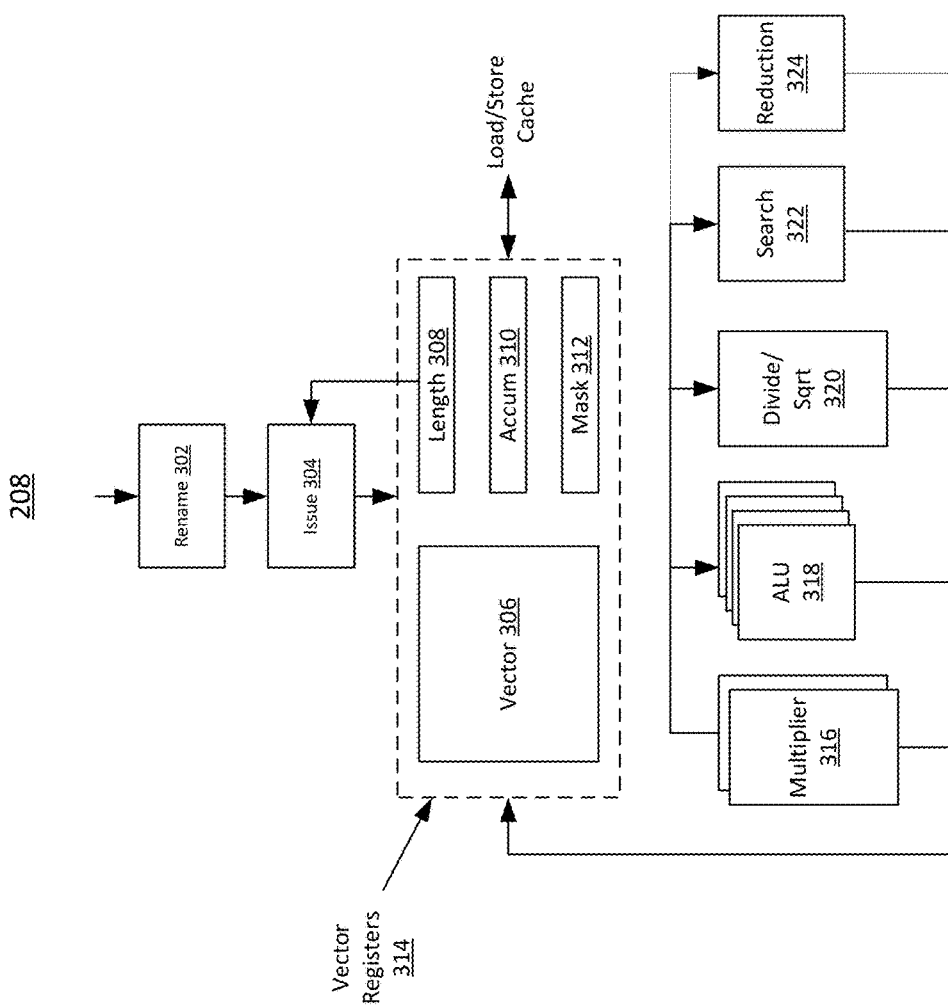
FIG. 3 is a vector unit of the vector processor as shown in FIG. 2.

The vector unit 208 may include various circuit blocks, as shown in FIG. 3. FIG. 3 illustrates a vector unit 208 according to an implementation of the present disclosure. The vector unit 208 as shown in FIG. 3 may include a register rename block 302 that renames the architected vector unit registers to physical registers. The vector unit 208 may further include an out-of-order issue block 304 that holds vector instructions that are not yet complete, and is responsible for sending these instructions for execution. Note that a vector instruction may be repeatedly issued based on the vector length and the number of functional units available for that instruction. The vector unit 308 may further include a variety of physical vector register files 314 that include: a vector register file 306 that holds vectors of elements; a vector length register file 308 that is used to specify the number of operations performed by a vector instruction; a vector accumulator register file 310 that holds scalar values resulting from operations such as summing up vectors; a vector mask register file 312 that holds single bit values, and is used to control the execution of vector operations; and variety of functional blocks (as shown in FIG. 3) which may include: 2 multipliers 316, 4 ALUs 318, a single divide and/or square root 320, a search block 322 for searching for minimum/maximum values, and a reduction block 324 for summing vector elements into a single value.

This combination of blocks as shown in FIG. 3 is selected for illustrative purposes, and is not exhaustive.

In one example, the vector processor registers that form the vector subset may include: vector registers that hold collections of elements operated on by vector instructions; vector count registers that are used to specify the length of vector instructions, and other places where element counts are used; vector mask registers that hold a vector of single bits, used to control behavior of vector instructions over single elements; and vector accumulator registers that are used when scalar values are needed as input or output for vector instructions.

Figure 4:
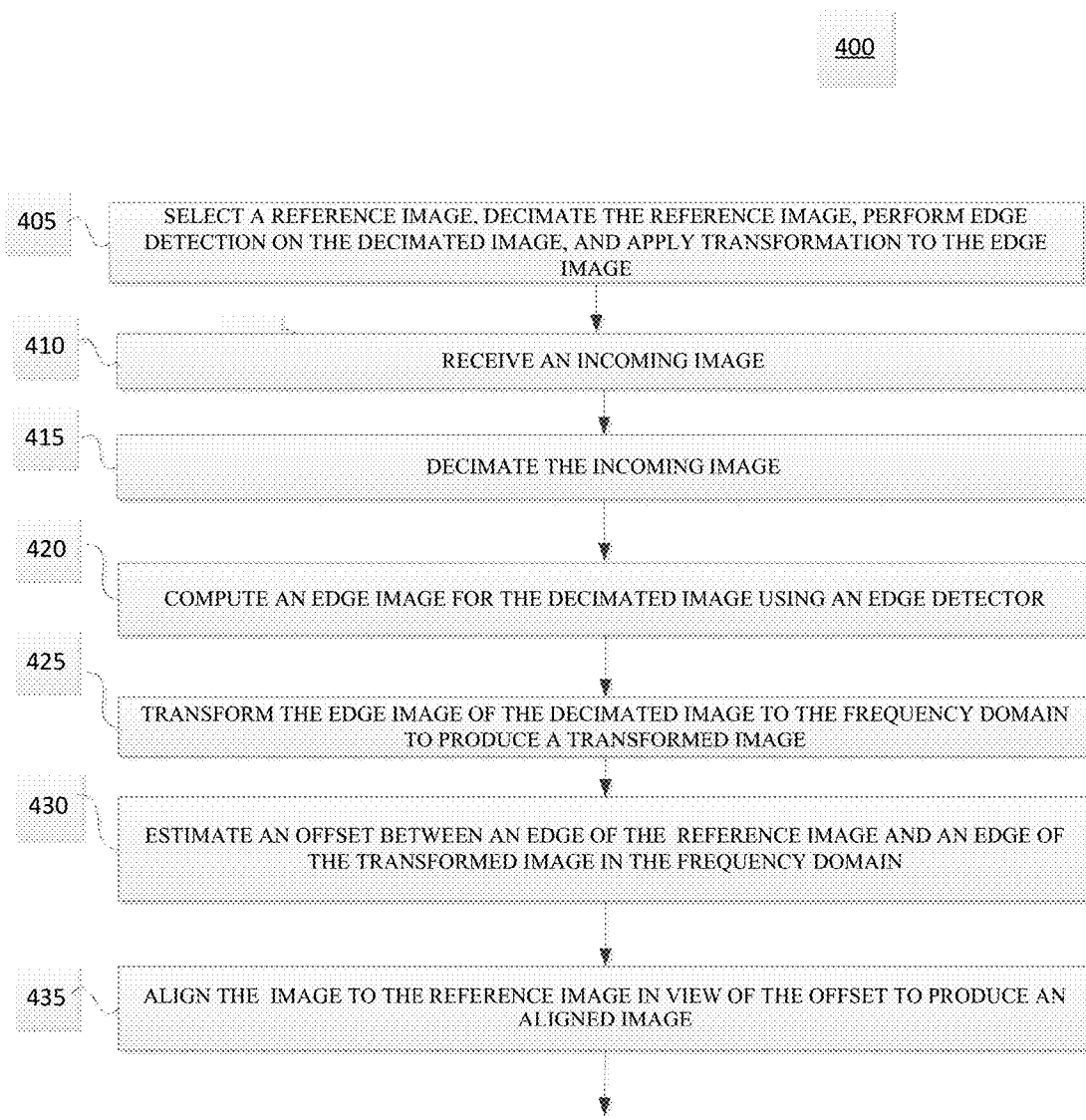
FIG. 4 is a flow diagram illustrating a method for aligning video frames according to an implementation of the present disclosure.

FIG. 4 is a flow diagram illustrating an example of a method 400 for aligning video frames in the frequency domain according to an implementation of the present disclosure. The method 400 may be performed by the alignment processor 145 of the processing device 135 of FIG. 1 and may include hardware (e.g., circuitry, dedicated logic, programmable logic, microcode, etc.), software (e.g., instructions run on a processing device), or a combination thereof.

As shown in FIG. 4, at block 405, the alignment processor 145 of the processing device 135 may select a reference video frame, decimate the reference video frame to generate a decimate image that is smaller than the original image, perform edge detection on the decimated image to generate an edge map, and apply a frequency transformation to convert the edge map of the decimated reference video frame to a frequency domain representation. At block 410, the alignment processor 145 may receive an incoming video frame that needs to be stabilized for jitters relative to the reference video frame. At block 415, the alignment processor 145 may decimate the incoming video frame at a same decimation ratio as the reference video frame. At block 420, the alignment processor 145 may compute an edge map for the decimated incoming video frame using an edge detector (e.g., an Canny edge detector).

At block 425, the alignment processor 145 may apply a frequency transformation (e.g., a 2D Fourier transformation) to the edge map of the decimated incoming video frame to generate a frequency domain representation of the edge map.

At block 430, the alignment processor 145 may estimate an offset between the reference video frame and the incoming video frame based on the frequency domain representation of the edge map of the decimated incoming video frame and the frequency domain representation of the edge map of the decimated reference video frame. In one implementation, the alignment processor 145 may calculate the offset by cross-correlating the frequency domain representation of the edge map of the decimated incoming video frame and the frequency domain representation of the edge map of the decimated reference video frame. At block 435, the alignment processor 145 may align the incoming video frame to the selected reference video frame in view of the offset to produce an aligned transformed image. The alignment may include shifting incoming video frame according to the offset which may include a pixel location translation in the horizontal direction (x-axis) and a pixel location translation in the vertical direction (y-axis) of the incoming video frame. The alignment processor 145 may adjust a location of each pixel of the transformed image in view of the one or more pixel offsets.

Figure 5:
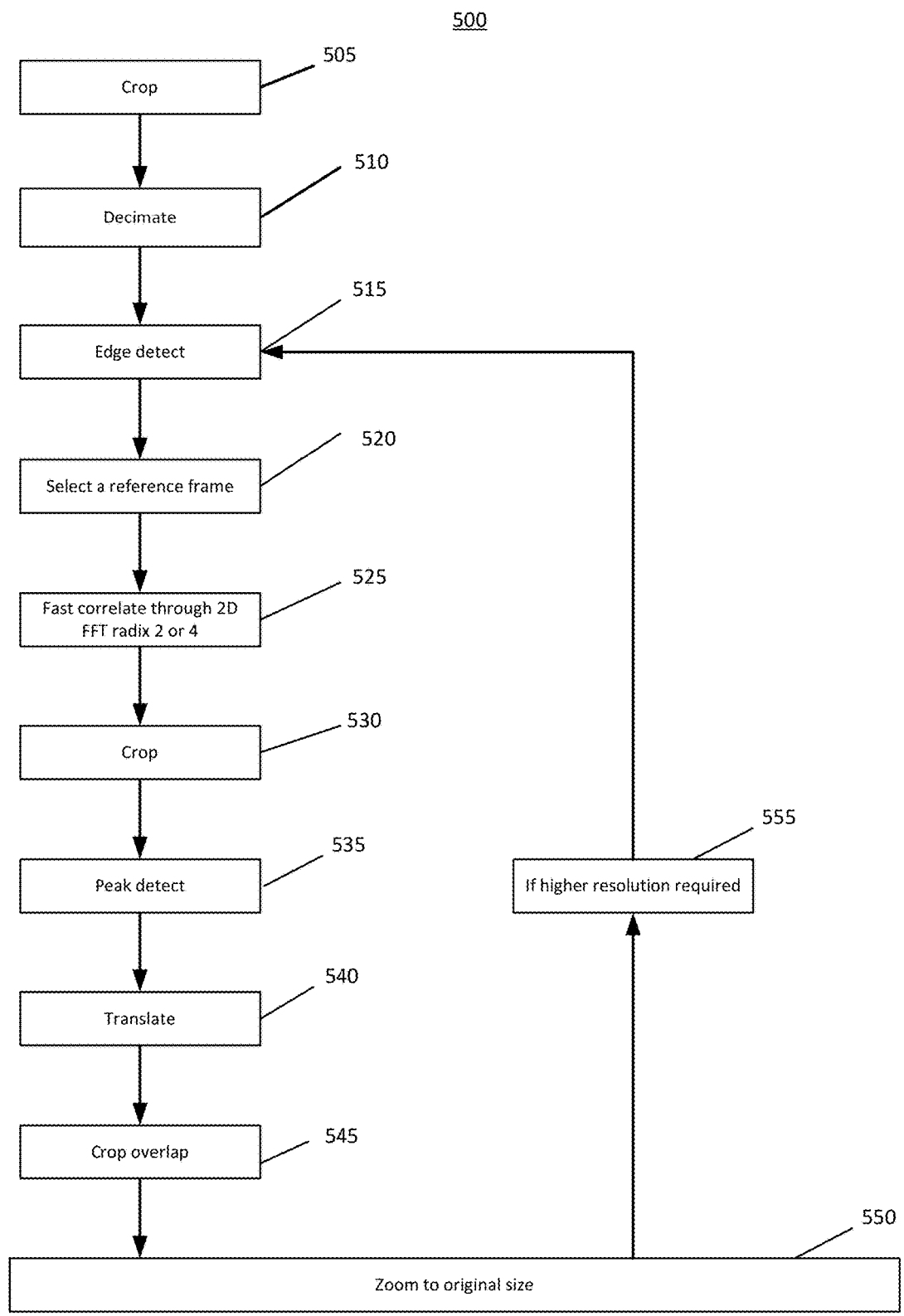
FIG. 5 is a flow diagram illustrating a method associated with the computing system of FIG. 1 to provide video frame alignment according to an implementation of the present disclosure.

FIG. 5 is a flow diagram illustrating a method 500 associated with the system of FIG. 1 to provide video frame alignment for video stabilization according to an implementation of the present disclosure. At block 505, if an image is larger than a certain size (e.g., 1024 by 1080 pixels), the alignment processor 145 may crop a smaller window (e.g., 1024 by 512 pixels) from the image, and process the cropped image to avoid boundary effects. At block 510, the alignment processor 145 may decimate the image k times, (e.g., k may be 4), resulting a subsampled image (e.g., 256 by 128 pixels when k=4). At block 515, the alignment processor 145 may perform edge detection using an edge detector (e.g., the Canny edge detector) on the subsampled image. In one implementation, the align detector may first perform pre-processing on the subsampled image. The pre-processing may include image smoothing using a Gaussian blurring filter.

At block 520, the alignment processor 145 selects a reference video frame. For video stabilization, in an example, the reference video frame can be the first frame in a video recording. The alignment processor 145 may change reference image if the total misalignment exceeds m % (m can be 10% for example). The last video frame in the sequence that is being aligned may become the reference for example or, may be a mid-frame.

At block 525, the alignment processor 145 may perform a fast correlation between the reference frame and next images/frames. The fast correlation may be performed in the frequency domain. In one implementation, the alignment processor 145 may perform the fast correlation in the frequency domain by first transforming the edge maps of the decimated video frame and the decimated reference video frame into frequency domain representations, and cross-correlate their frequency domain representations to determine the offset between the video frame and the reference video frame.

At block 530, the alignment processor 145 may crop M×N pixels from the cross correlation image to discard the correlation boundary effects.

At block 535, the alignment processor 145 may detect and store the cross correlation peak (x, y) position for each image. In an example, block 535 may be executed in the vector FP unit 212 of the vector processor 150.

At block 540, after processing a number of images (3-6 images) or frames (10-60) frames for example), the alignment processor 145 may align (translate) the original full size images according to the (x, y) position of each image or frame. [[Daniel, how does the peak at (x, y) in frequency domain relate to the offsets in spatial domain?]] At block 545, after translation, the images may have black borders. The alignment processor 145 may discard the black borders by cropping the minimum size image of each image/frame (the one that has the largest misalignment will be the smallest and will have the largest black border. Note, the overlap frame size should be the same for multiple references to avoid resealing the subsequent frames.

After removing the black borders, at block 550, the alignment processor 145 may zoom in each image to the original size. The zoom-in may include resample the processed image to the original size (e.g., 1024 by 1080 pixels). In an example, block 550 is mainly filtering and may be executed by the alignment processor 145 in the vector FP unit 312.

The alignment resolution may be equal to the decimation factor. For example, if the decimation factor is 4, the resolution will be 4 pixels. If better resolution is required, at block 555, the process may be repeated as follows: the alignment processor 145 may crop, for example, 256/128 pixels from the center of each aligned image, and then the alignment processor 145 may repeat the execution of blocks 515 through 550. The resulting resolution will be one pixel in this case.

Five methods may be evaluated to compare with the frequency domain method. To ease expression, OST may denote a scale-invariant feature transform (SIFT) implementation by OST, OST2 may denote the proposed frequency domain processing approach, Lowe may denote SIFT implemented as described in Canny, J., "A Computational Approach To Edge Detection", IEEE Trans. Pattern Analysis and Machine Intelligence, pp. 679-698, 1986, AV may denote a SIFT implementation as described in "http://vision.ucla.edu/~vedaldi/code/sift.html," and KLT may denote the Karhunen-Loève transform as described in "http://www.ces.clemson.edu/~stb/klt/."

Six video frames tr1-tr6, as shown in FIGS. 6A, 7A, 9A, 11A, 13A, and 15A, respectively, are created from one video frame which is captured from a video. In order to evaluate the effectiveness of each method, a certain area of the video frame may be taken to create six images. The offset between any pair of images is known, and the offset is used as reference to validate if each evaluated method can accurately find the pixel offset between each image pair. Further, the intensity of those images may be increased, since the intensity also influences the video quality as well as the complexity for video stabilization.

Figure 6A:
FIG. 6A is a test video frame and the corresponding detected edges (test video frame 1 (i.e., tr1)).
Figure 6B:
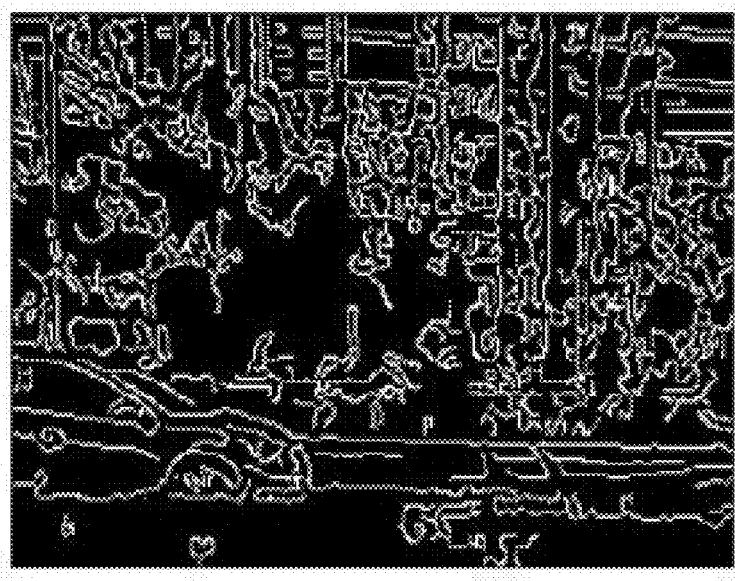
FIG. 6B is a test video frame and the corresponding detected edges (detected edge by OST2).
Figure 6C:
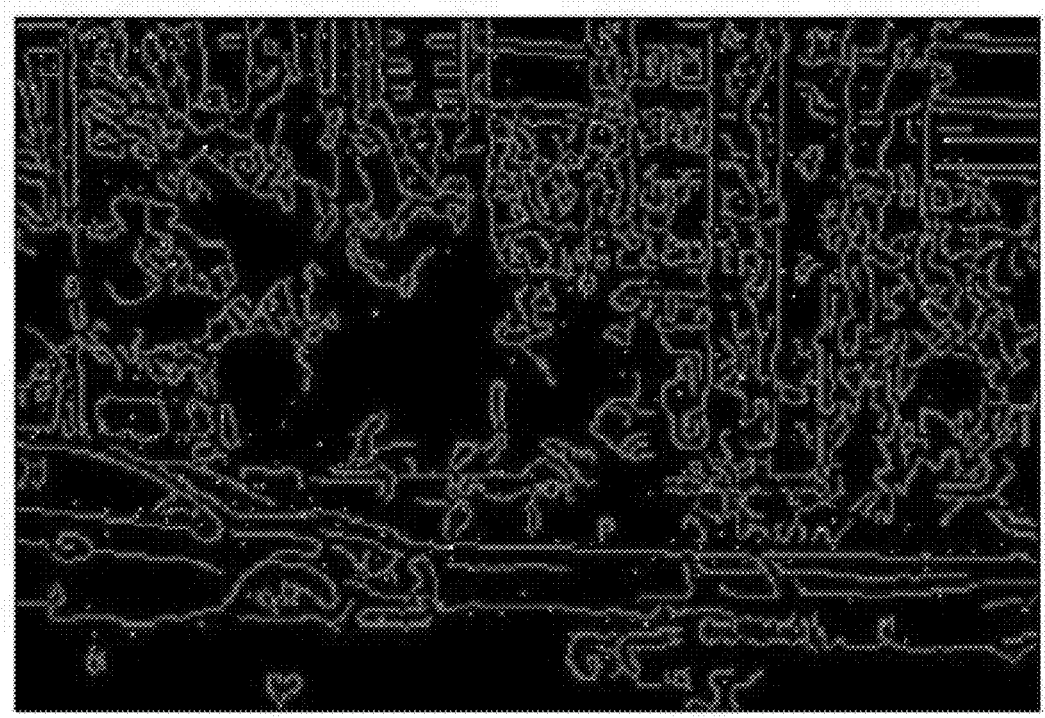
FIG. 6C is a test video frame and the corresponding detected edges (detected edge by OST2 (lines) and the found keypoints by SIFT (dots)).
Figure 7A:
FIG. 7A is a test video frame and the corresponding detected edges (test video frame 2 (i.e., tr2)).
Figure 7B:
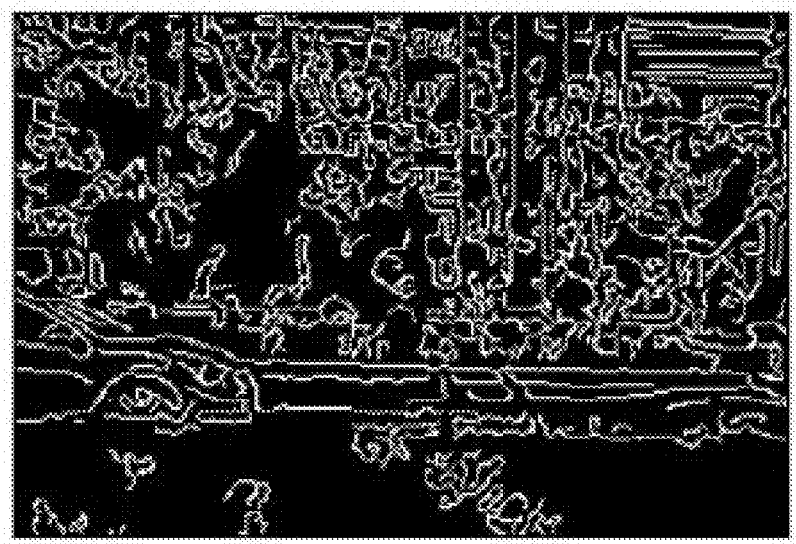
FIG. 7B is a test video frame and the corresponding detected edges (detected edge by OST2.
Figure 8A:
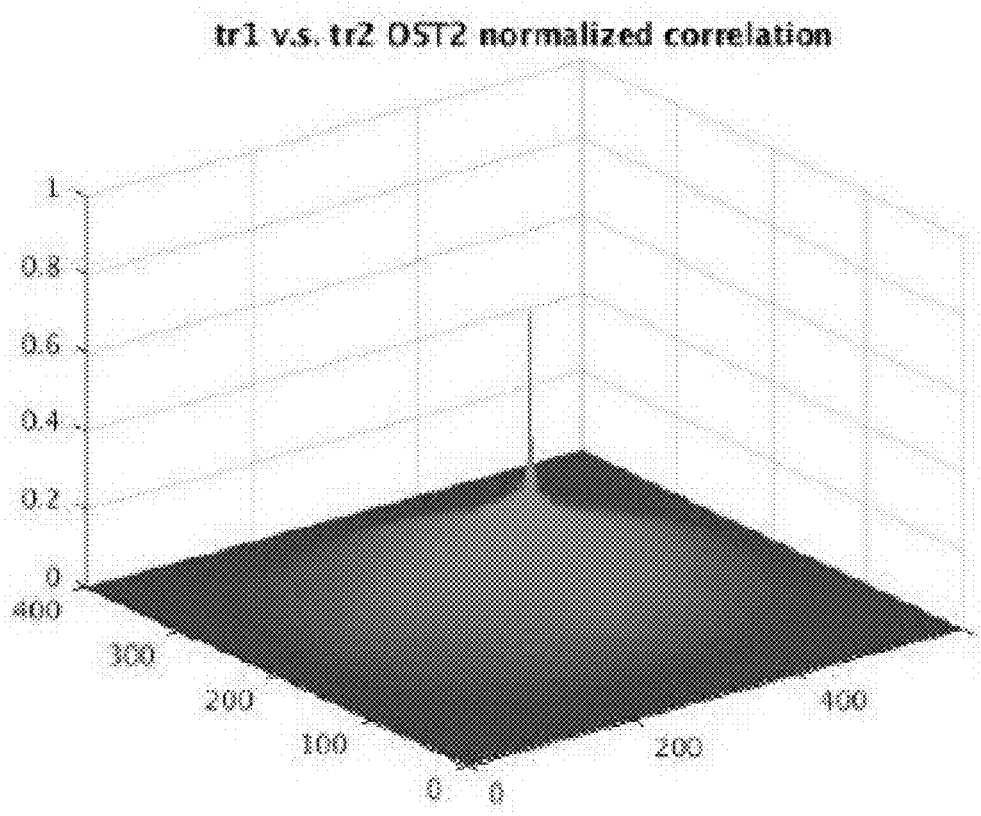
FIG. 8A is a test video frame and the corresponding detected edges (normalized correlation; tr1 and tr2 normalized correlation results).
Figure 8B:
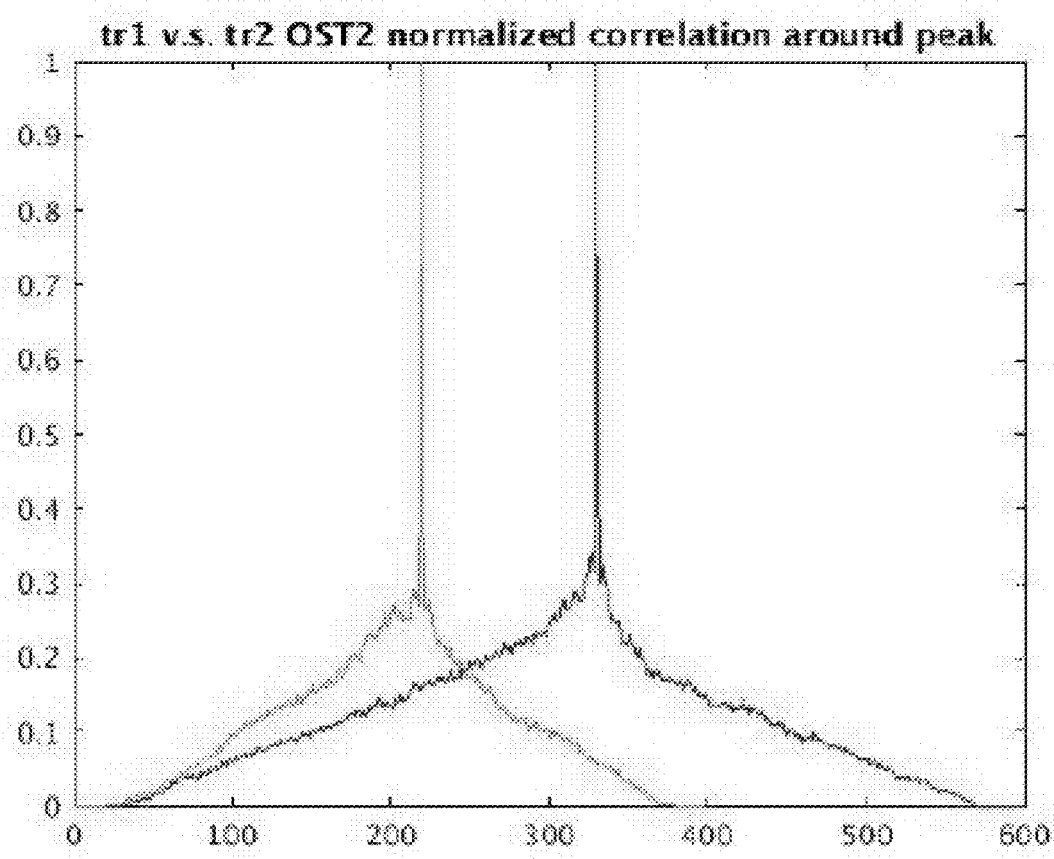
FIG. 8B is a test video frame and the corresponding detected edges (normalized correlation around peak; tr1 and tr2 normalized correlation results).
Figure 8C:
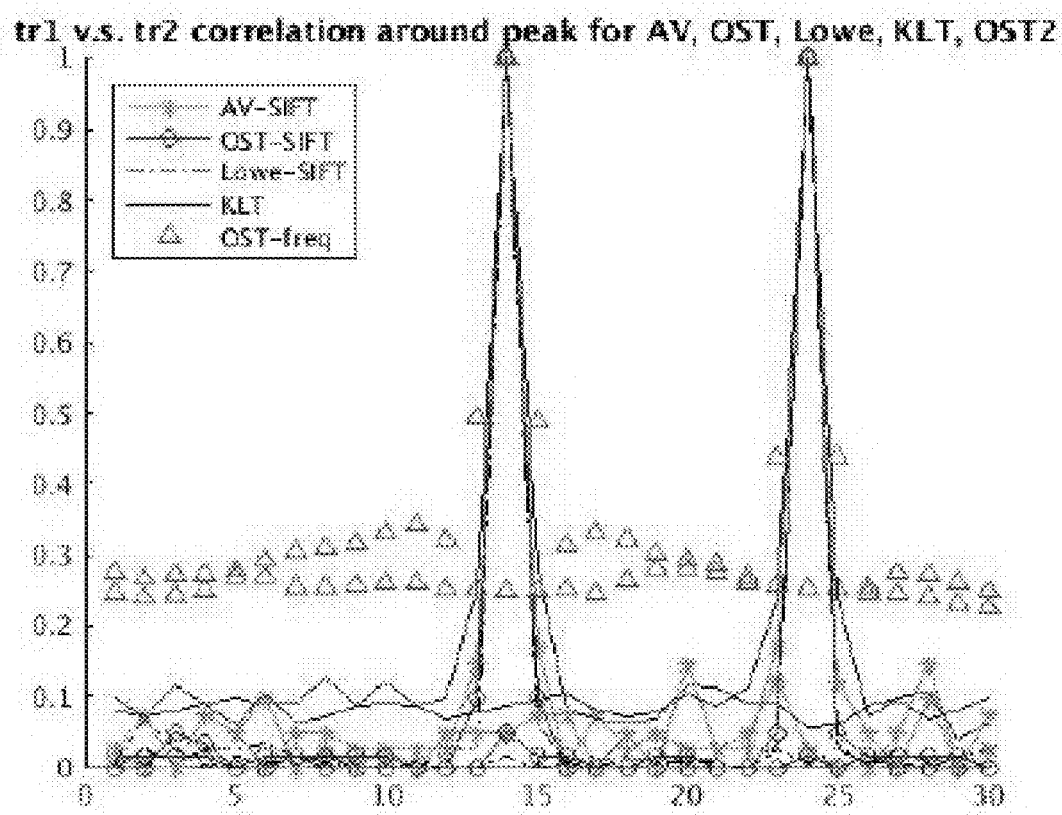
FIG. 8C is a test video frame and the corresponding detected edges (normalized correlation around peak; tr1 and tr2 normalized correlation results).
Figure 9A:
FIG. 9A is a test video frame and the corresponding detected edges (test video frame 13 (i.e., tr3)).
Figure 9B:
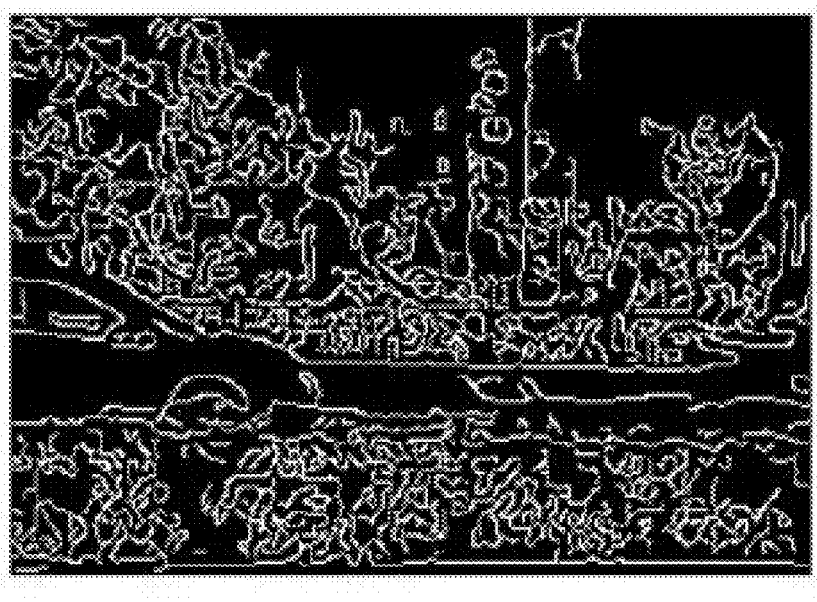
FIG. 9B is a test video frame and the corresponding detected edges (detected edge by OST2).
Figure 10A:
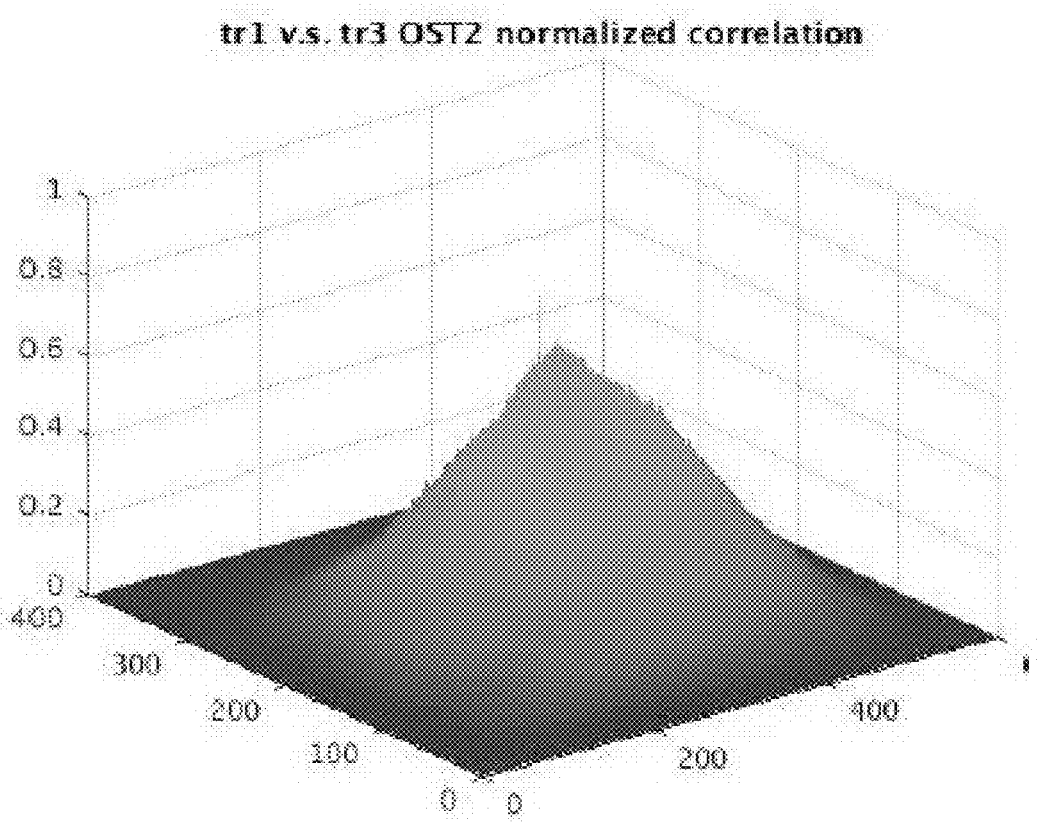
FIG. 10A is a test video frame and the corresponding detected edges (normalized correlation; tr1 and tr3 normalized correlation results).
Figure 10B:
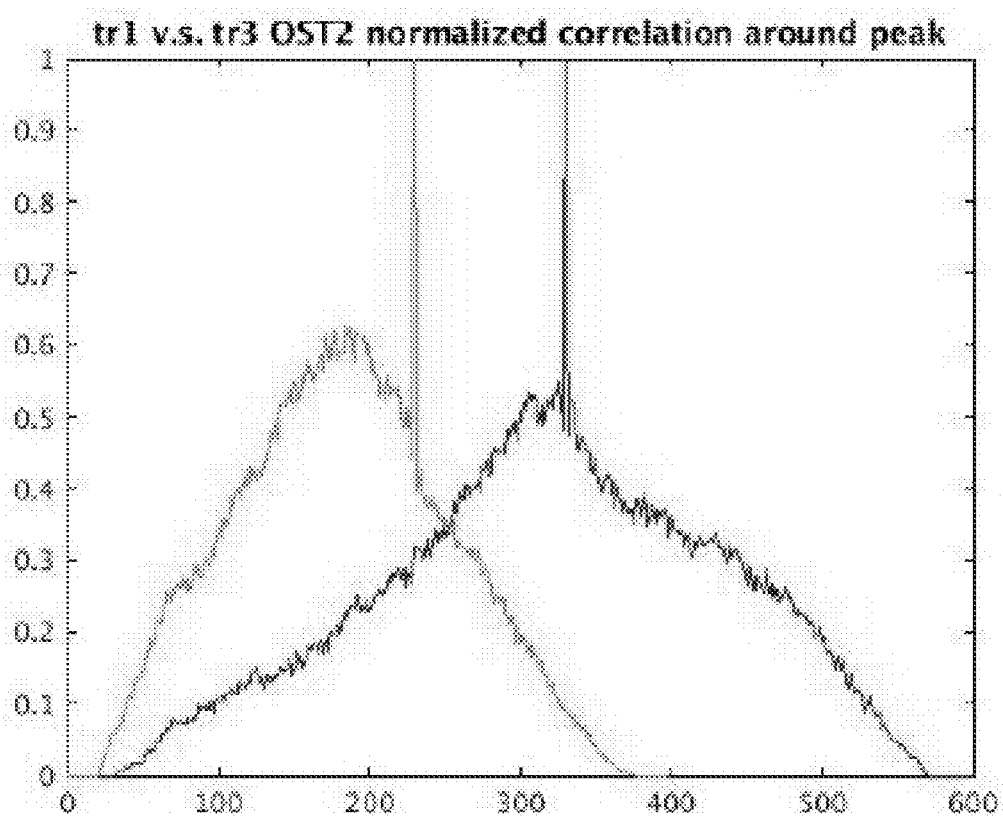
FIG. 10B is a test video frame and the corresponding detected edges (normalized correlation around peak; tr1 and tr3 normalized correlation results).
Figure 10C:
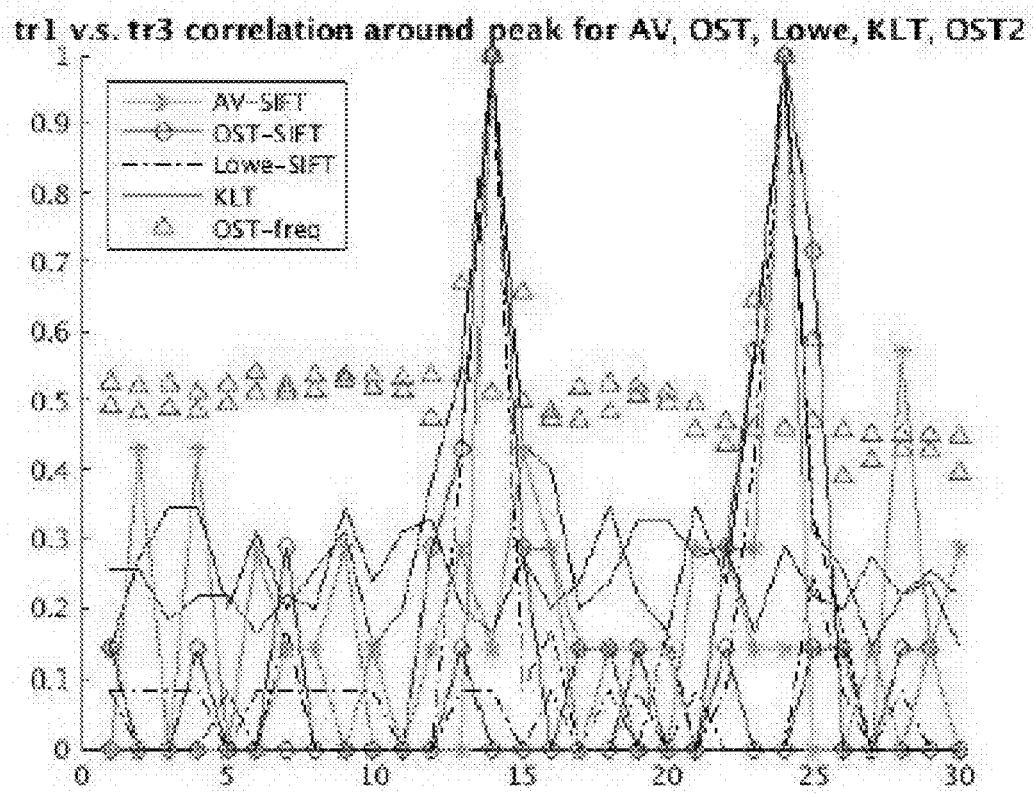
FIG. 10C is a test video frame and the corresponding detected edges (normalized correlation around peak; tr1 and tr3 normalized correlation results).
Figure 11A:
FIG. 11A is a test video frame and the corresponding detected edges (test video frame 4 (i.e., tr4)).
Figure 11B:
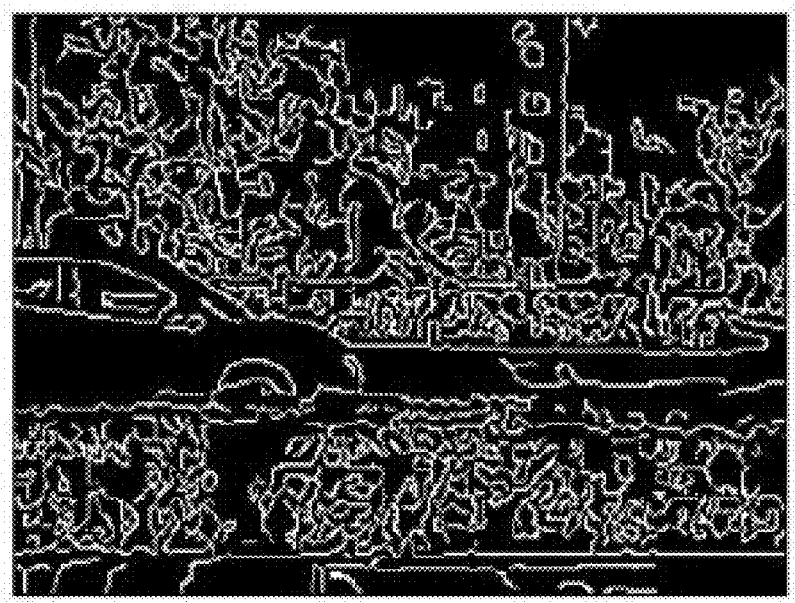
FIG. 11B is a test video frame and the corresponding detected edges (detected edge by OST2).
Figure 12A:
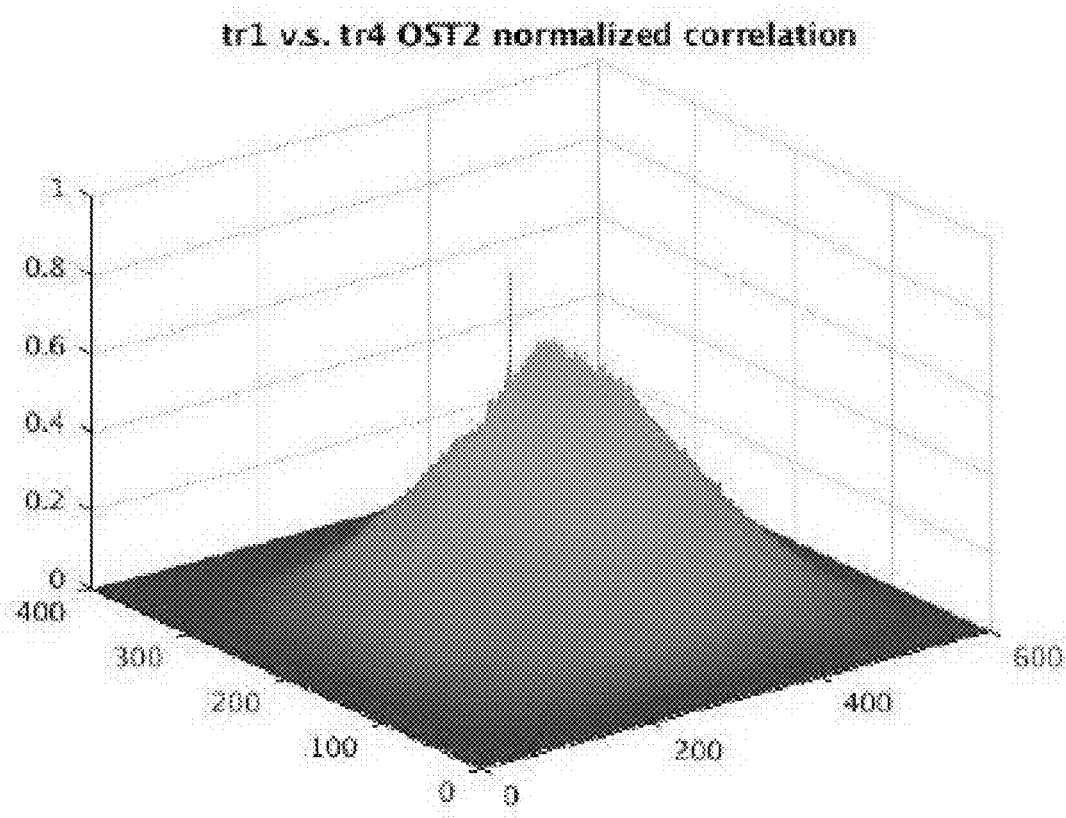
FIG. 12A is a test video frame and the corresponding detected edges (normalized correlation; tr1 and tr4 normalized correlation results).
Figure 12B:
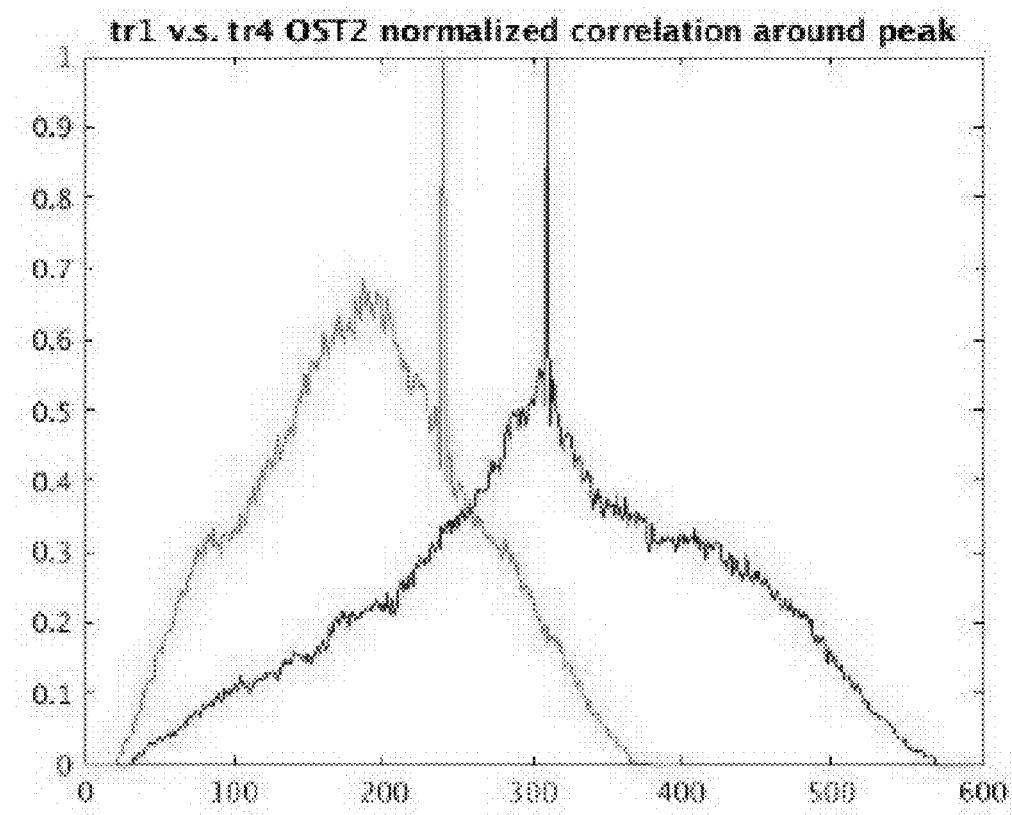
FIG. 12B is a test video frame and the corresponding detected edges (normalized correlation around peak; tr1 and tr4 normalized correlation results).
Figure 12C:
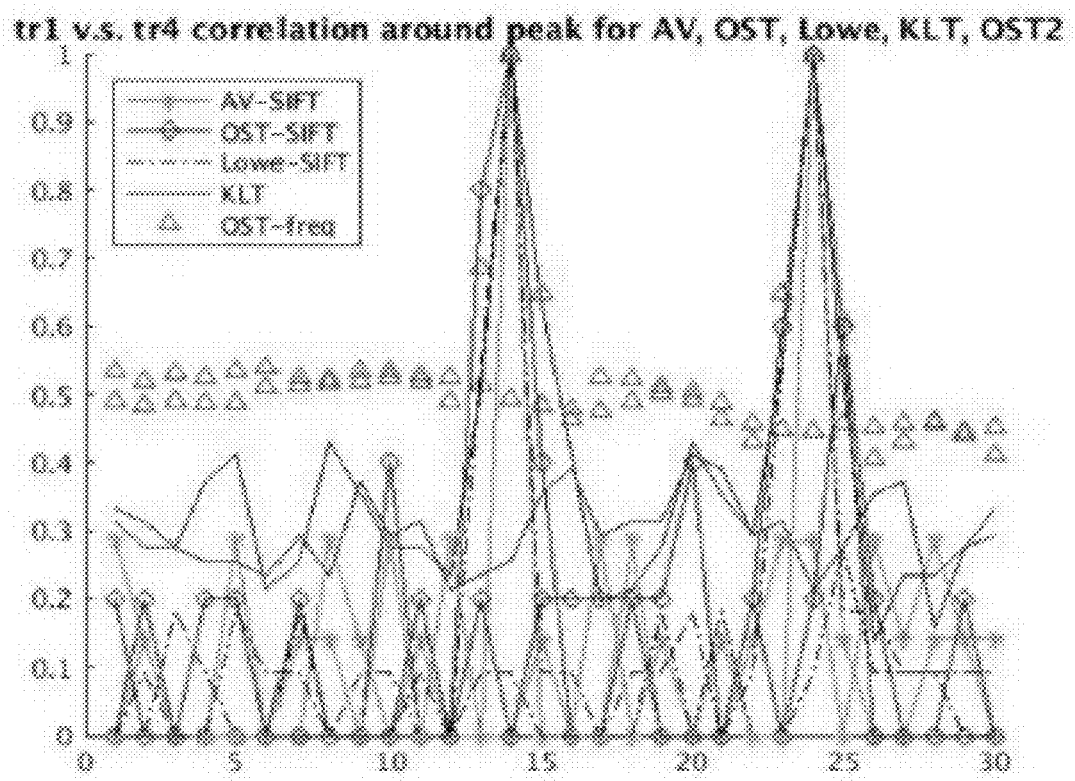
FIG. 12C is a test video frame and the corresponding detected edges (normalized correlation around peak; tr1 and tr4 normalized correlation results).
Figure 13A:
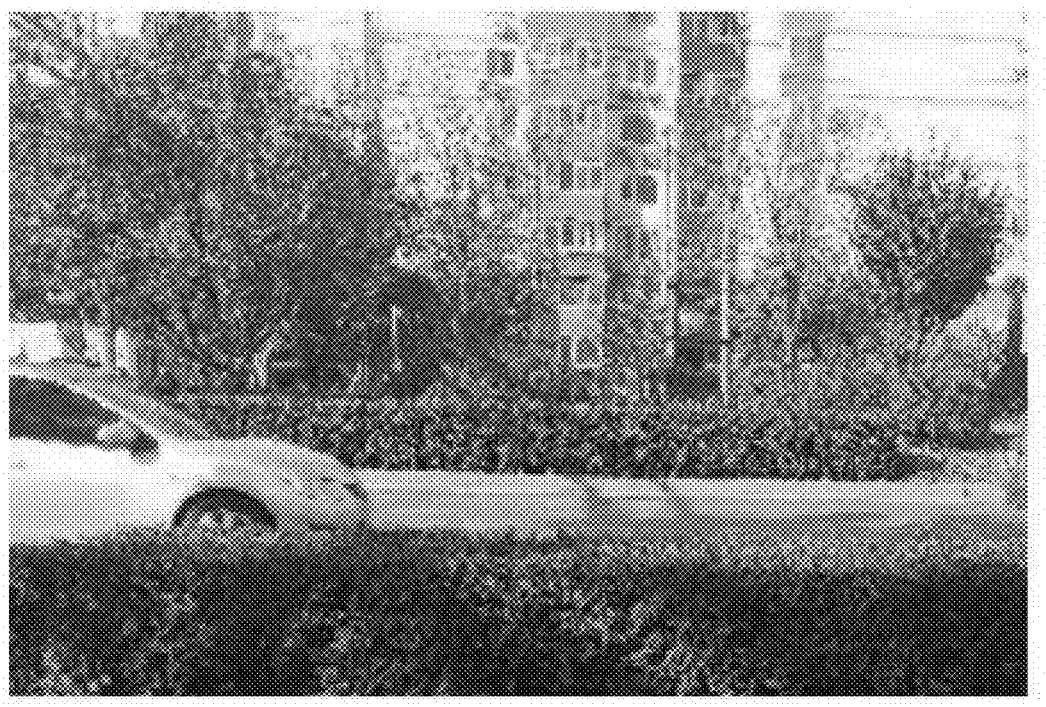
FIG. 13A is a test video frame and the corresponding detected edges (test video frame 5 (i.e., tr5)).
Figure 13B:
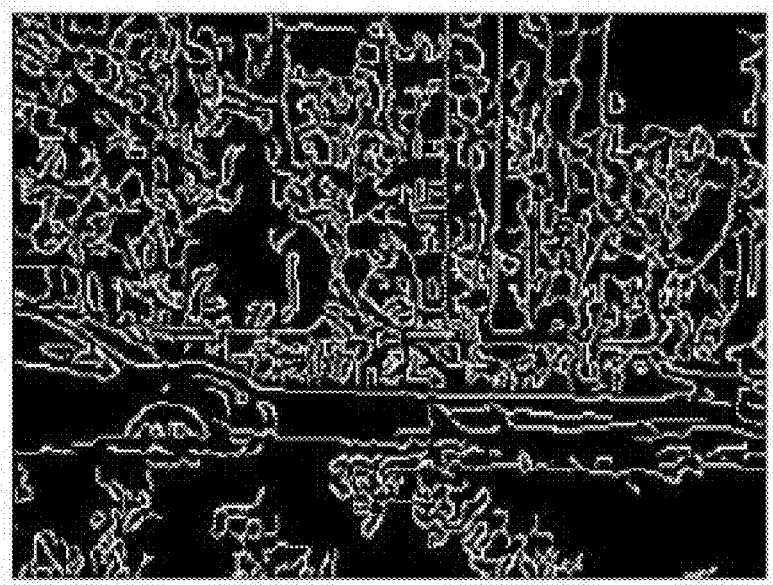
FIG. 13B is a test video frame and the corresponding detected edges (detected edge by OST2).
Figure 14A:
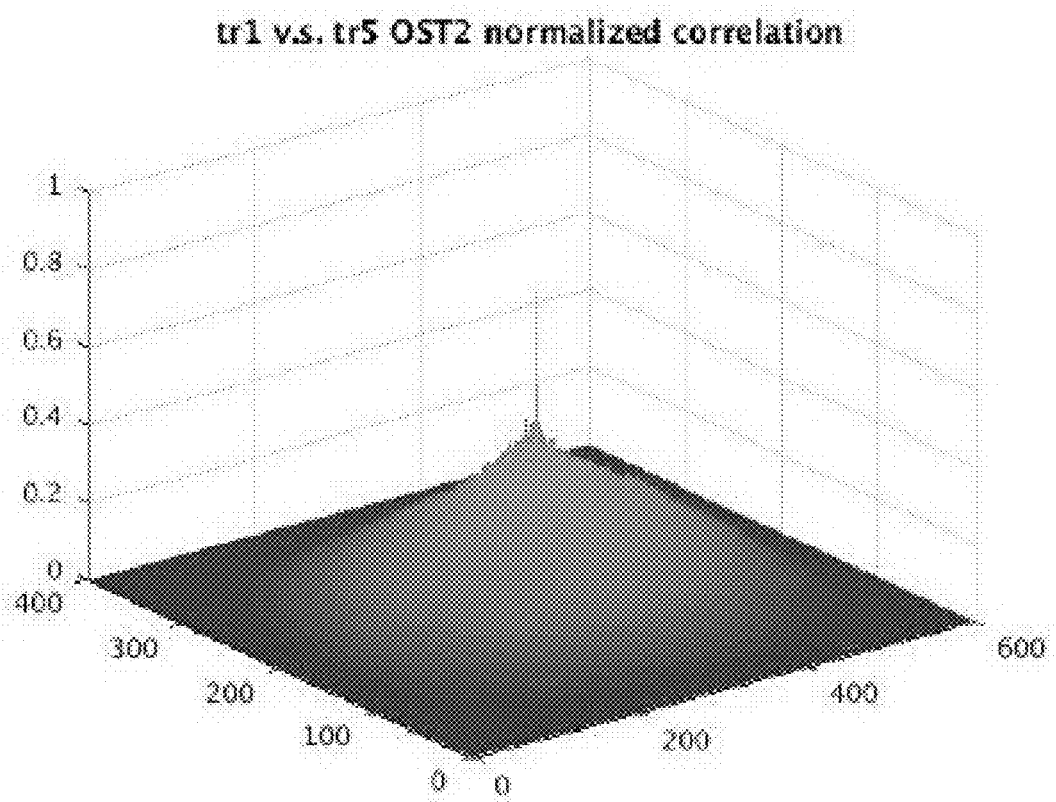
FIG. 14A is a test video frame and the corresponding detected edges (normalized correlation; tr1 and tr5 normalized correlation results).
Figure 14B:
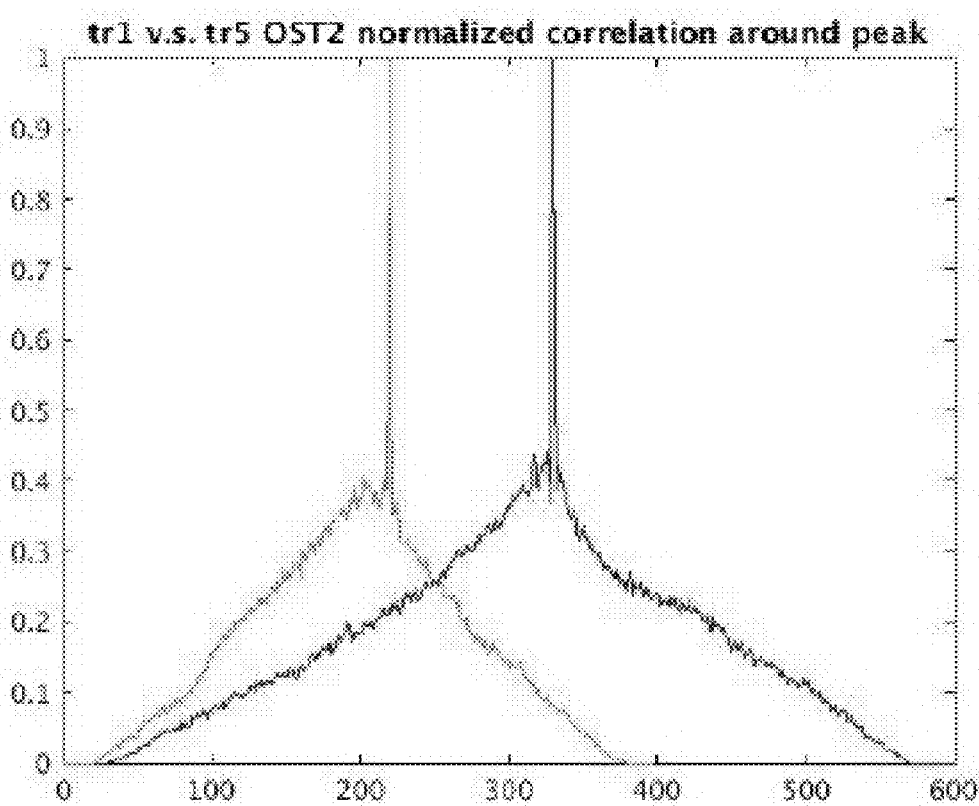
FIG. 14B is a test video frame and the corresponding detected edges (normalized correlation around peak; tr1 and tr5 normalized correlation results).
Figure 14C:
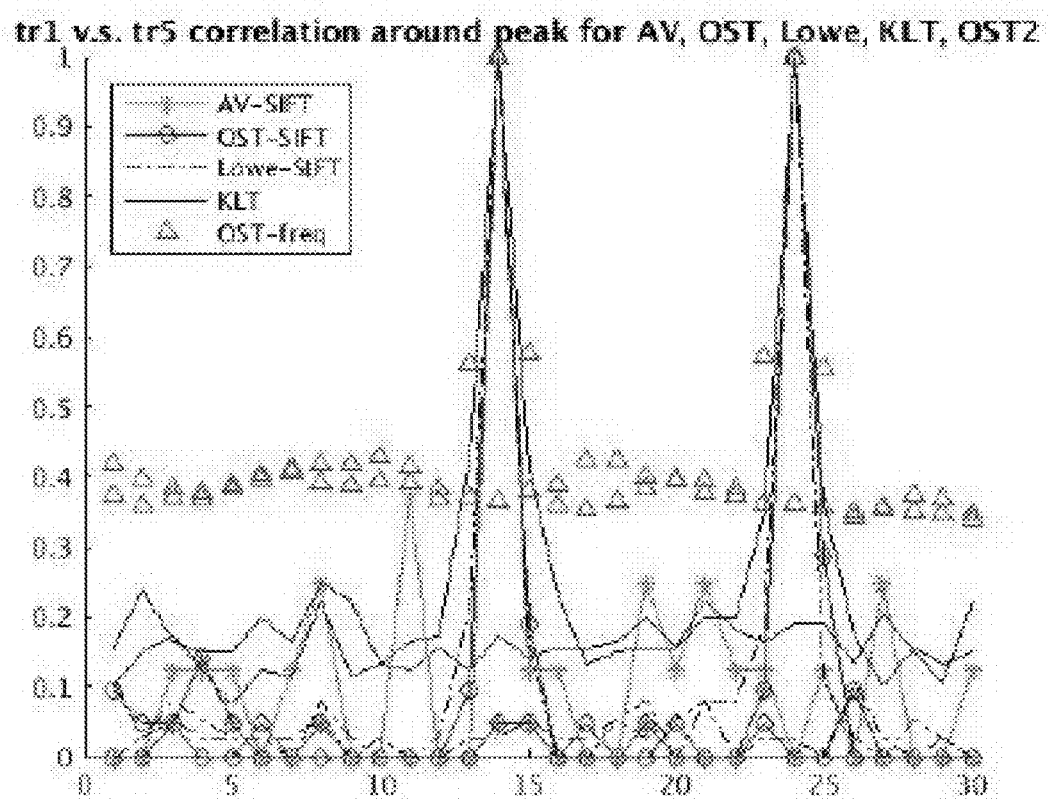
FIG. 14C is a test video frame and the corresponding detected edges (normalized correlation around peak; tr1 and tr5 normalized correlation results).
Figure 15A:
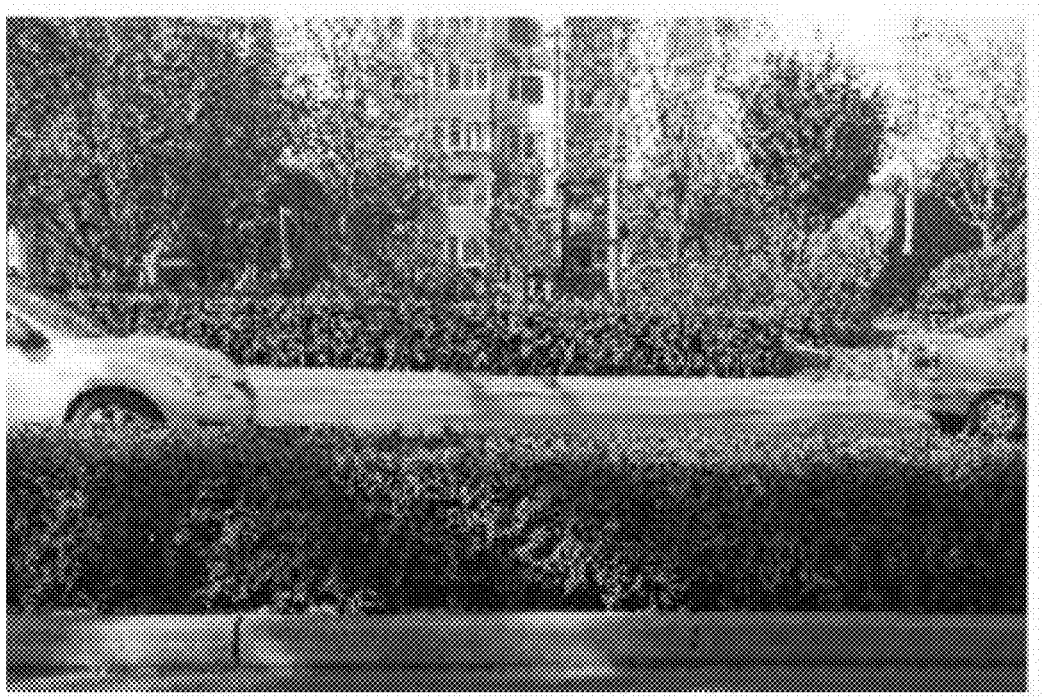
FIG. 15A is a test video frame and the corresponding detected edges (test video frame 6 (i.e., tr6)).
Figure 15B:
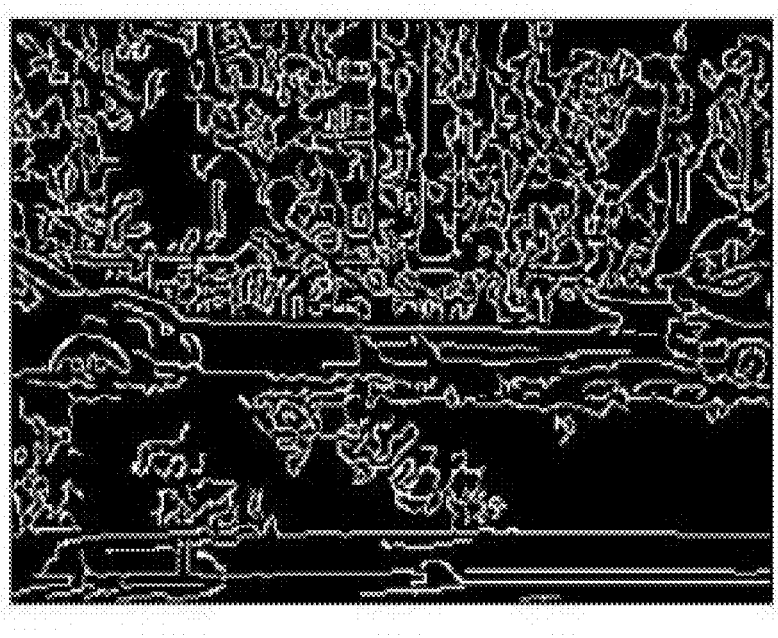
FIG. 15B is a test video frame and the corresponding detected edges (detected edge by OST2).
Figure 16A:
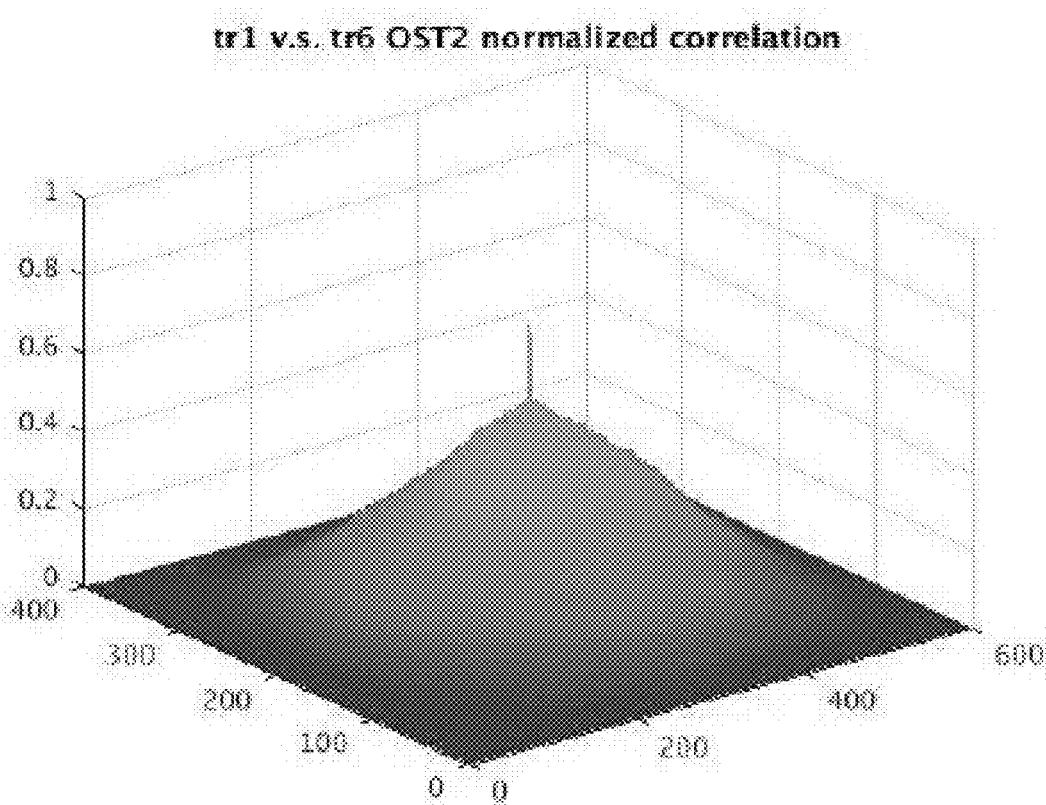
FIG. 16A is a test video frame and the corresponding detected edges (normalized correlation; tr1 and tr6 normalized correlation results).
Figure 16B:
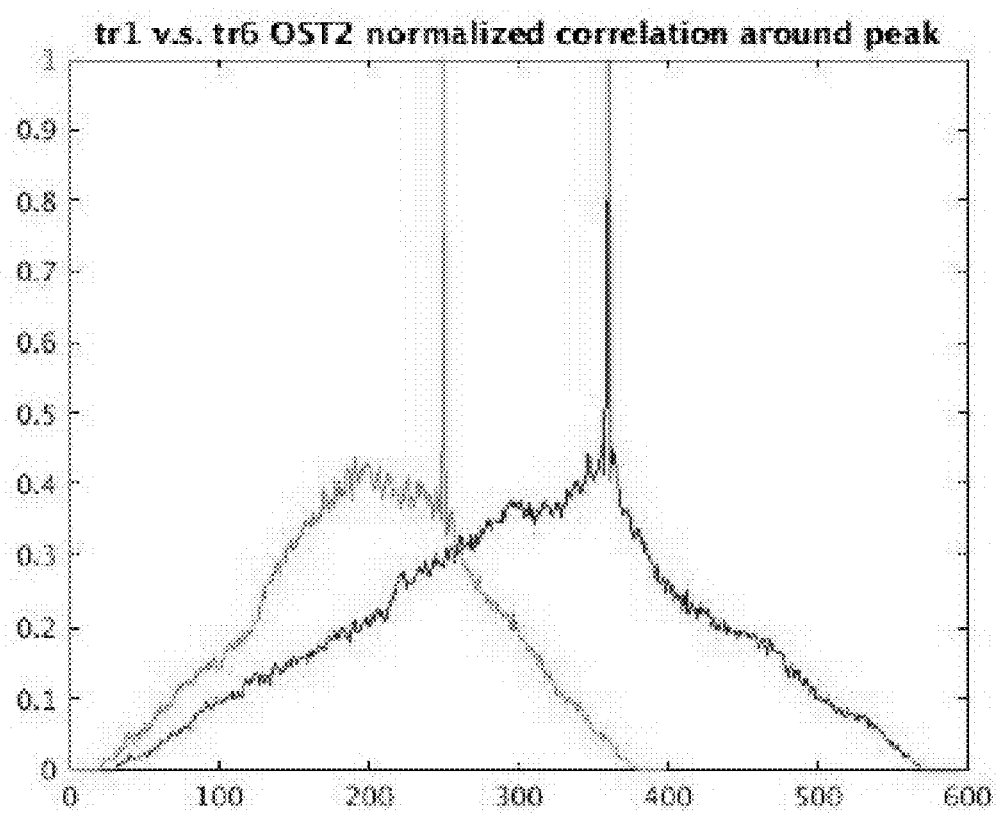
FIG. 16B is a test video frame and the corresponding detected edges (normalized correlation around peak; tr1 and tr6 normalized correlation results).
Figure 16C:
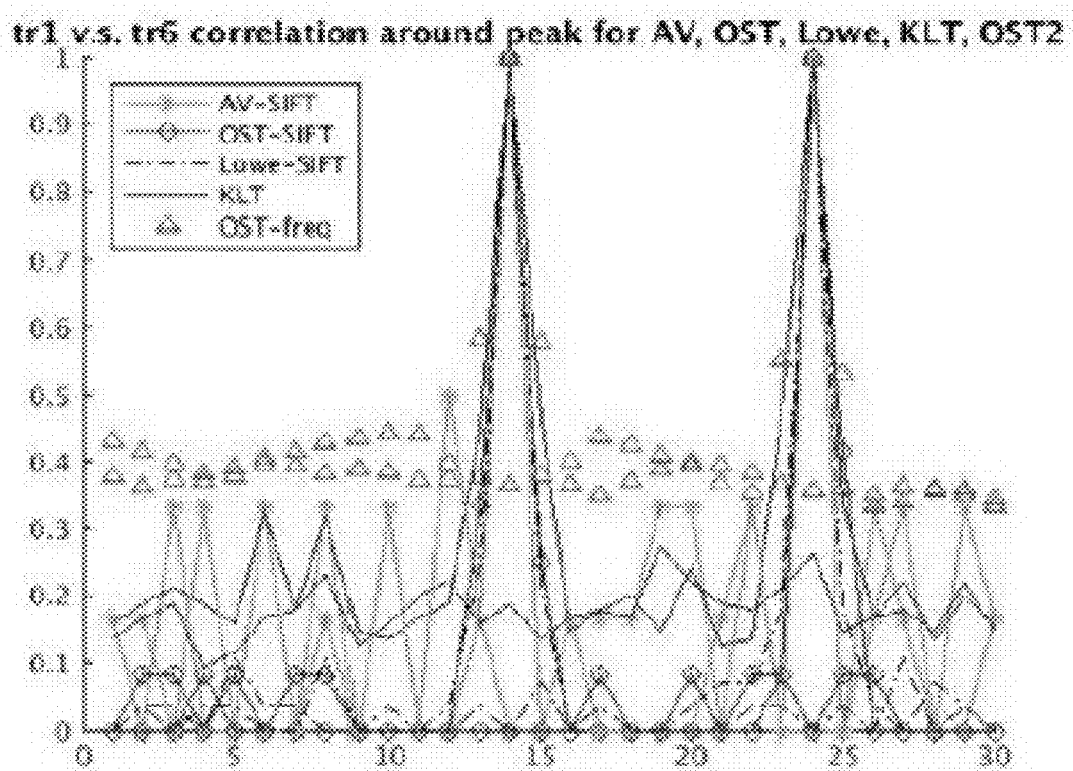
FIG. 16C is a test video frame and the corresponding detected edges (normalized correlation around peak; tr1 and tr6 normalized correlation results).

In OST2, the first step is to find the edge of each image. The detected edges by OST2 can be seen in FIGS. 6B, 7B, 9B, 11B, 13B, and 15B. Additionally, FIG. 6C illustrates the found edges by OST2 (i.e., white line) and the selected keypoints by Lowe (i.e., purple dots). The relationship of processing results between edge detection and keypoints selection may be observed in advance.

To align video frames, the pixel offsets between the edges of an incoming video frame and the edges of the reference video frame are estimated. In this evaluation, tr1 is applied to be the reference video frame, and tr2-tr6 are corrected according to tr1 as incoming video frames. To estimate the pixel offset of each incoming video frame, the cross correlation of the detected edges/keypoints between these two video frames is calculated. The peak location of the cross correlation is used as a reference for alignment. For ease of observation, the cross correlation results are normalized further. FIGS. 8A-8C, 10A-10C, 12A-12C, 14A-14C, and 16A-16C present the results of the normalized cross correlation of tr2-tr6.

TABLE 1

Number of required keypoints for alignment

| | OST | OST2 | Lowe | AV | KLT |
|---|---|---|---|---|---|
| Number of required points to correctly align image | 280 | None | 280 | 280 | 1000 |

Table 1 lists the number of required keypoints for correctly aligning the six video frames tr1-tr6. Although the peak location of normalized cross correlation for each method is identical as seen in FIGS. 8A-8C, 10A-10C, 12A-12C, 14A-14C, and 16A-16C, the number of used keypoints to estimate the correct peak location is not the same. To properly align video frames, OST2 (frequency domain processing) does not have minimum requirement of the number of keypoints unlink SIFT and KLT. Further, the computational complexity relies on the target number of keypoints in SIFT as described in Lowe, and more keypoints are needed for correct offset estimation. Comparing to SIFT, KLT needs more keypoints for the offset estimation. In addition, the required keypoints are the same, since OST, Lowe, AV are just different implementations of SIFT.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Figure 17:
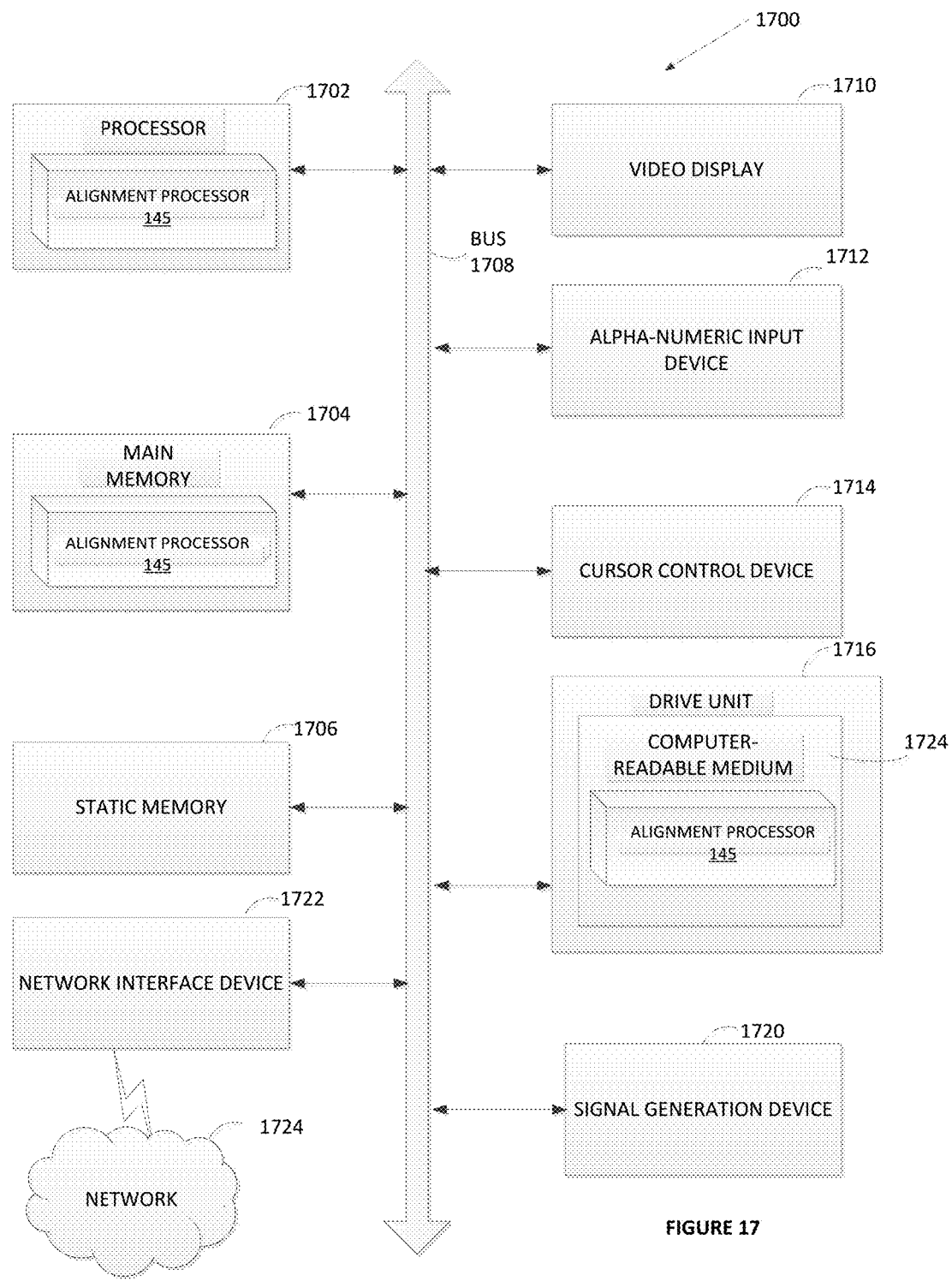
FIG. 17 illustrates a diagrammatic representation of a machine in the example form of a computer system within which a set of instructions, for causing the machine to perform any one or more of the methodologies discussed herein, may be executed.

FIG. 17 illustrates a diagrammatic representation of a machine in the example form of a computer system 1700 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processing device (processor) 1702, a main memory 1704 (e.g., read-only memory (ROM), flash memory, dynamic random access memory (DRAM) such as synchronous DRAM (SDRAM)), a static memory 1706 (e.g., flash memory, static random access memory (SRAM)), and a data storage device 1716, which communicate with each other via a bus 1708.

Processor 1702 represents one or more general-purpose processing devices such as a microprocessor, central processing unit, or the like. More particularly, the processor 1702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1702 may also be one or more special-purpose processing devices such as an application specific integrated circuit (ASIC), a field programmable gate array (FPGA), a digital signal processor (DSP), network processor, or the like. The alignment processor 145 shown in FIG. 1 may be executed by processor 1702 configured to perform the operations and steps discussed herein.

The computer system 1700 may further include a network interface device 1722. The computer system 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), and a signal generation device 1720 (e.g., a speaker).

A drive unit 1716 may include a computer-readable medium 1724 on which is stored one or more sets of instructions (e.g., instructions of the alignment processor 145) embodying any one or more of the methodologies or functions described herein. The instructions of the alignment processor 145 may also reside, completely or at least partially, within the main memory 1704 and/or within the processor 1702 during execution thereof by the computer system 1700, the main memory 1704 and the processor 1702 also constituting computer-readable media. The instructions of the alignment processor 145 may further be transmitted or received over a network via the network interface device 1722.

While the computer-readable storage medium 1724 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and translates to a new coordinate system the data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. The system and method as disclosed herein for transmission, reception, and restoration and upscaling of chroma channels decimated by more than one octave improves the perceptual quality and/or the transmission or storage efficiency of existing image and video compression or transmission systems and methods solves problems in many fields, such as real-time efficiency for over-the-top video delivery, cost-effective real-time reduction of public radio-access-network congestion when both uploading and downloading video and image data from mobile devices, increased real-time pass-band television delivery capacity, increase of satellite transponder capacity, reduction of storage costs for content management systems and network DVR architectures, and high-throughput treatment of images and video at the distribution network core as but a few examples.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
generating, by a processing device executing an edge detector, a first edge map associated with a reference video frame;
generating, by the processing device executing the edge detector, a second edge map associated with an incoming video frame;
calculating, by the processing device, an offset between the reference video frame and the video frame based on a first frequency domain representation of the first edge map and a second frequency domain representation of the second edge map;
translating, by the processing device, locations of a plurality of pixels of the incoming video frame according to the calculated offset to align the incoming video frame with respect to the reference video frame; and
transmitting, by the processing device, the aligned video frame to a downstream device.

2. The method of claim 1, wherein translating the locations of the plurality of pixels further comprises:
adjusting a location of each one of the plurality of pixels of the video frame based on the offset.

3. The method of claim 1, wherein the reference video frame is updated at a rate that depends on at least one of video frame rate or video quality.

4. The method of claim 1, further comprising:
decimating the incoming video frame to generate a decimated incoming video frame; and
decimating the reference video frame to generate a decimated reference video frame.

5. The method of claim 4, further comprising:
generating the first edge map by applying the edge detector on the decimated reference video frame; and
generating the second edge map by applying the edge detector on the decimated incoming video frame.

6. The method of claim 5, further comprising:
applying a frequency transformation to the first edge map to generate the first frequency domain representation; and
applying the frequency transformation to the second edge map to generate the second frequency domain representation.

7. The method of claim 6, wherein the frequency transformation is a Fourier transformation.

8. The method of claim 1, wherein the edge detector is a Canny edge detector.

9. The method of claim 1, wherein calculating the offset between the reference video frame and the video frame further comprises:
calculating a cross-correlation between the first frequency domain representation and the second frequency domain representation;
determining a location of a peak in the cross-correlation; and
determining the offset based on the location of the peak in the cross-correlation.

10. A system, comprising:
a memory;
a processing device, operatively coupled to the memory, to:
generate, by executing an edge detector, a first edge map associated with a reference video frame;
generate, by executing the edge detector, a second edge map associated with an incoming video frame;
calculate an offset between the reference video frame and the video frame based on a first frequency domain representation of the first edge map and a second frequency domain representation of the second edge map;
translate locations of a plurality of pixels of the incoming video frame according to the calculated offset to align the incoming video frame with respect to the reference video frame; and
transmit the aligned video frame to a downstream device.

11. The system of claim 10, wherein to translate the locations of the plurality of pixels, the processing device is further to adjust a location of each one of the plurality of pixels of the video frame based on the offset.

12. The system of claim 10, wherein the processing device is further to:
decimate the incoming video frame to generate a decimated incoming video frame; and
decimate the reference video frame to generate a decimated reference video frame.

13. The system of claim 12, wherein the processing device is further to:
generate the first edge map by applying the edge detector on the decimated reference video frame; and
generate the second edge map by applying the edge detector on the decimated incoming video frame.

14. The system of claim 13, wherein the processing device is further to:
apply a frequency transformation to the first edge map to generate the first frequency domain representation; and
apply the frequency transformation to the second edge map to generate the second frequency domain representation.

15. The system of claim 14, wherein the frequency transformation is a Fourier transformation, and wherein the edge detector is a Canny edge detector.

16. A non-transitory computer-readable medium storing instructions that, when executed by a processing device, cause the processing device to:
generate, by the processing device executing an edge detector, a first edge map associated with a reference video frame;
generate, by the processing device executing the edge detector, a second edge map associated with an incoming video frame;
calculate, by the processing device, an offset between the reference video frame and the video frame based on a first frequency domain representation of the first edge map and a second frequency domain representation of the second edge map;
translate, by the processing device, locations of a plurality of pixels of the incoming video frame according to the calculated offset to align the incoming video frame with respect to the reference video frame; and
transmit, by the processing device, the aligned video frame to a downstream device.

17. The non-transitory computer-readable medium of claim 16, to translate the locations of the plurality of pixels, the processing device is further to adjust a location of each one of the plurality of pixels of the video frame based on the offset.

18. The non-transitory computer-readable medium of claim 16, wherein the processing device is further to:
   decimate the incoming video frame to generate a decimated incoming video frame; and
   decimate the reference video frame to generate a decimated reference video frame.

19. The non-transitory computer-readable medium of claim 18, wherein the processing device is further to:
   generate the first edge map by applying the edge detector on the decimated reference video frame; and
   generate the second edge map by applying the edge detector on the decimated incoming video frame.

20. The non-transitory computer-readable medium of claim 19, wherein the processing device is further to:
   apply a frequency transformation to the first edge map to generate the first frequency domain representation; and
   apply the frequency transformation to the second edge map to generate the second frequency domain representation.

* * * * *